United States Patent [19]

Nam

[11] Patent Number: 5,754,330
[45] Date of Patent: May 19, 1998

[54] THIN FILM ACTUATED MIRROR ARRAY IN AN OPTICAL PROJECTION SYSTEM AND METHOD FOR MANUFACTURING THE SAME

[75] Inventor: Yun-Woo Nam, Seoul, Rep. of Korea

[73] Assignee: Daewoo Electronics Co., Ltd., Seoul, Rep. of Korea

[21] Appl. No.: 812,837

[22] Filed: Mar. 6, 1997

[51] Int. Cl.$^6$ .................................................. G02B 26/00
[52] U.S. Cl. ...................... 359/291; 359/295; 359/224; 359/846; 310/328; 348/771
[58] Field of Search ............................. 359/290, 291, 359/295, 224, 618, 846; 310/328, 333; 348/771, 764

[56] References Cited

U.S. PATENT DOCUMENTS

| | | | |
|---|---|---|---|
| 4,492,435 | 1/1985 | Banton et al. | 359/295 |
| 5,078,479 | 1/1992 | Vuilleumier | 359/290 |
| 5,126,836 | 6/1992 | Um | 348/771 |
| 5,469,302 | 11/1995 | Lin | 359/846 |
| 5,481,396 | 1/1996 | Ji | 359/295 |
| 5,610,757 | 3/1997 | Ji et al. | 359/295 |
| 5,661,611 | 8/1997 | Kim et al. | 359/295 |

FOREIGN PATENT DOCUMENTS 0 741 310  11/1996  European Pat. Off. .

*Primary Examiner*—Loha Ben
*Attorney, Agent, or Firm*—Cushman Darby & Cushman Intellectual Property Group of Pillsbury Madison & Sutro

[57] ABSTRACT

Thin film AMA in an optical projection system and a method for manufacturing the same are disclosed. The thin film AMA has a substrate having an electrical wiring and a connecting terminal, an actuator formed on the substrate, and a reflecting member formed on the actuator. The actuator has a plurality of actuating portions in which adjacent actuating portions tilt in opposite directions one after another. Each actuating portion has bottom electrodes, active layers, top electrodes, and via contacts. The top electrodes and bottom electrodes of the actuating portions are cross-connected, so electric fields are generated in opposite directions. The reflecting member installed on the actuator has a large tilting angle. Therefore, the light efficiency of the light reflected by the reflecting member increases and the contrast of the picture projected onto a screen also increases.

30 Claims, 27 Drawing Sheets

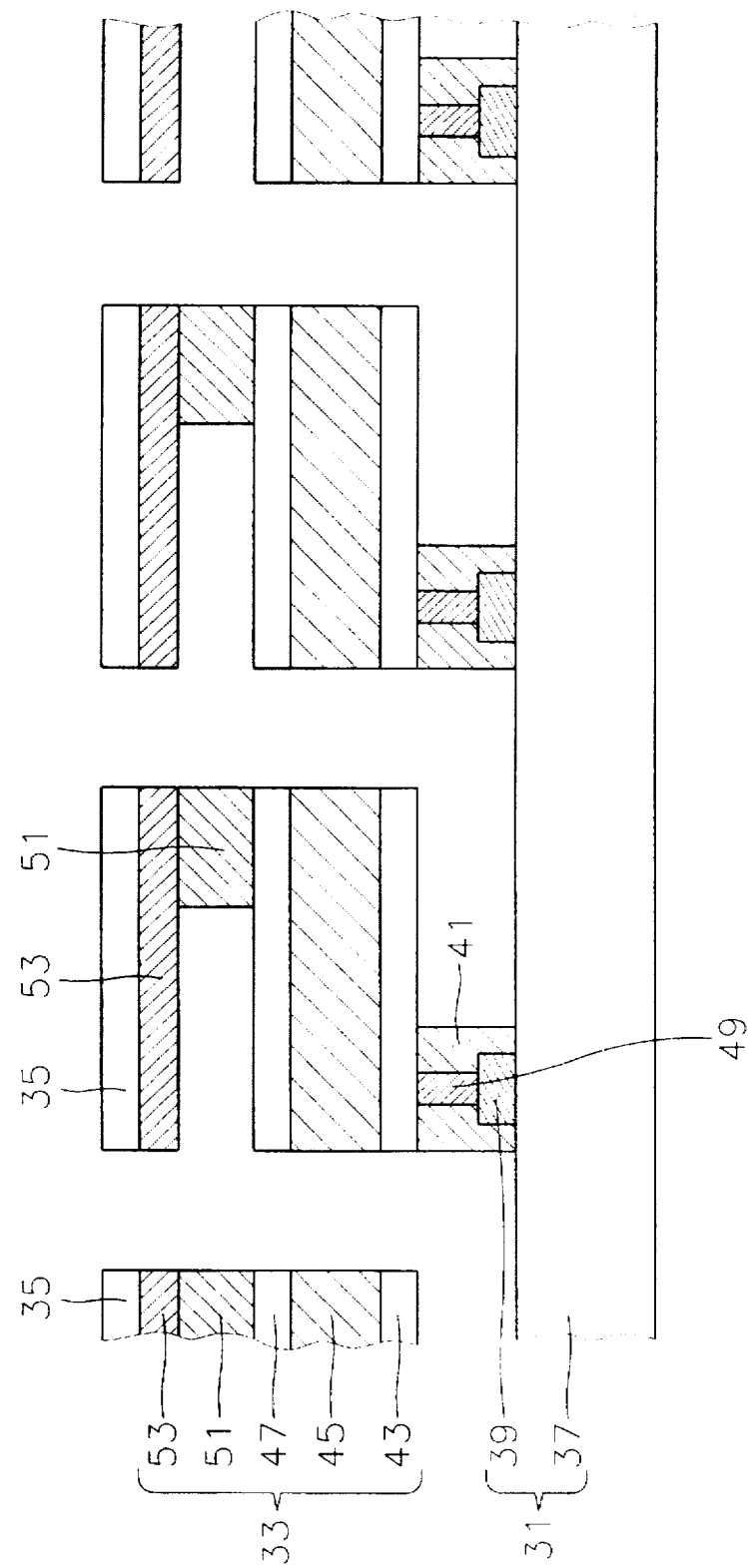

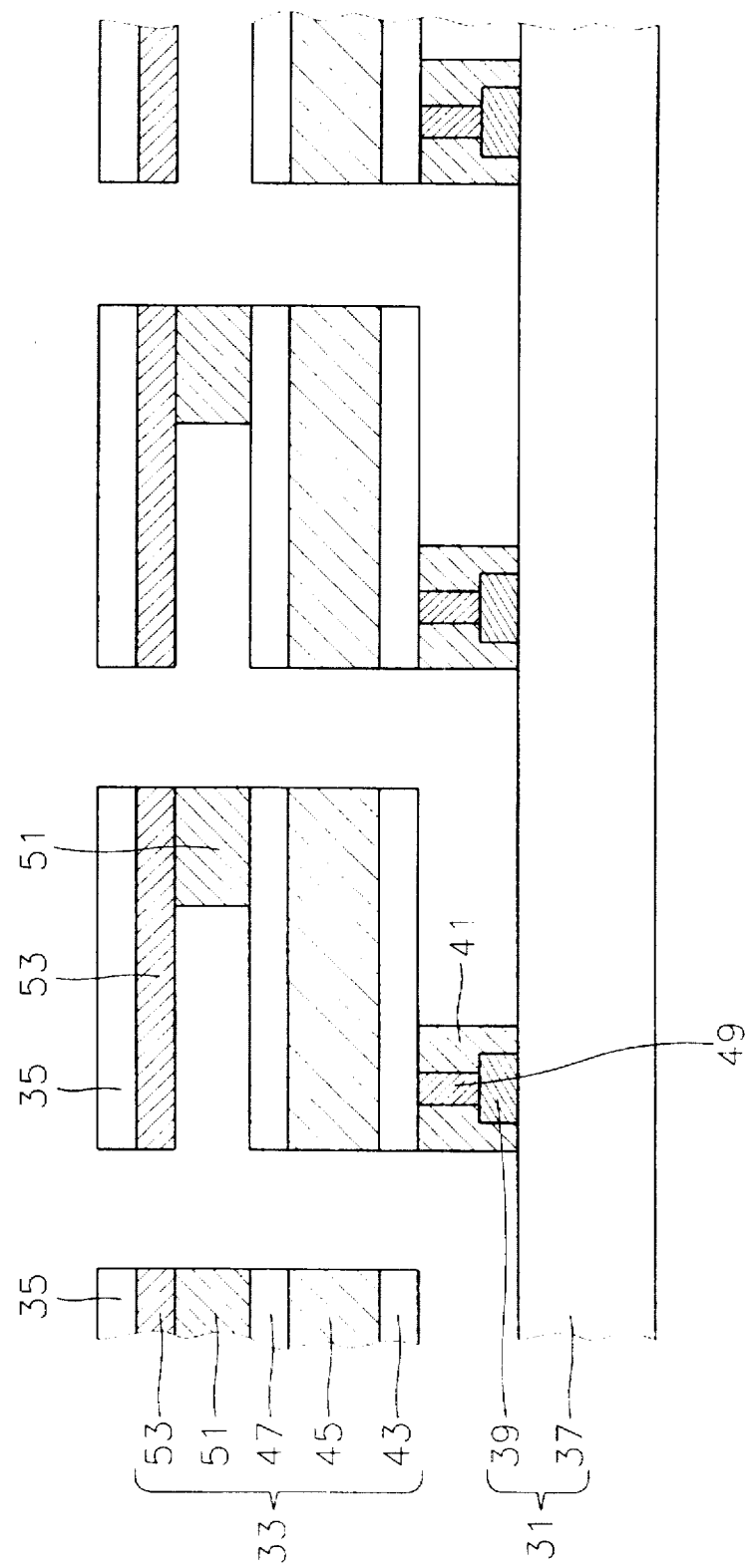

THIN FILM ACTUATED MIRROR ARRAY IN AN OPTICAL PROJECTION SYSTEM AND METHOD FOR MANUFACTURING THE SAME

BACKGROUND OF THE INVENTION

The present invention relates to a thin film actuated mirror array in an optical projection system and to a method for manufacturing the same, and more particularly to a thin film actuated mirror array in an optical projection system having a reflecting member and an actuator having a plurality of actuating parts in which adjacent actuating parts are actuated in opponent directions one after another, so the reflecting member installed on the actuator has a large tilting angle, and to a method for manufacturing the same.

In general, light modulators are divided into two groups according to their optics. One type is direct light modulators such as a cathode ray tube (CRT). The other type is transmissive light modulators such as a liquid crystal display (LCD). The CRT produce superior quality pictures on a screen, but the weight, the volume and the manufacturing cost of the CRT increase according to the magnification of the screen. The LCD has a simple optical structure, so the weight and the volume of the LCD are less than those of the CRT. However, the LCD has a poor light efficiency of under 1 to 2% due to light polarization. Also, there are some problems in the liquid crystal materials of the LCD such as sluggish response and overheating.

Thus, a digital mirror device (DMD) and actuated mirror arrays (AMA) have been developed in order to solve these problems. At the present time, the DMD has a light efficiency of about 5%, the AMA has a light efficiency of above 10%. The AMA enhances the contrast of a picture on a screen, so the picture on the screen is more apparent and brighter. The AMA is not affected by and does not affect the polarization of light and therefore, the AMA is more efficient than the LCD or the DMD.

FIG. 1 shows a schematic diagram of an engine system of a conventional AMA which is disclosed in U.S. Pat. No. 5,126,836 (issued to Gregory Um). Referring to FIG. 1, a ray of incident light from a light source 1 passes a first slit 3 and a first lens 5 and is divided into red, green, and blue lights according to the Red•Green•Blue (R•G•B) system of color representation. After the divided red, green, and blue lights are respectively reflected by a first mirror 7, a second mirror 9, and a third mirror 11, the reflected light is respectively incident on AMA devices 13, 15, and 17 corresponding to the mirrors 7, 9, and 11. The AMA devices 13, 15, and 17 tilt mirrors installed therein, so the incident light is reflected by the mirrors 7, 9, and 11. In this case, the mirrors 7, 9, and 11 installed in the AMA devices 13, 15, and 17 are tilted according to the deformation of active layers formed under mirrors. The lights reflected by the AMA devices 13, 15, and 17 pass a second lens 19 and a second slit 21 and form a picture on a screen (not shown) by using projection lens 23.

The AMA is generally divided into a bulk type AMA and a thin film type AMA. The bulk type AMA is disclosed in U.S. Pat. No. 5,469,302 (issued to Dae-Young Lim). In the bulk type AMA, after a ceramic wafer which is composed of multilayer ceramics inserted into metal electrodes therein is mounted on an active matrix having transistors, a mirror is mounted on the ceramic wafer by means of sawing the ceramic wafer. However, the bulk type AMA has disadvantages in that it demands a very accurate process and design, and the response of an active layer is slow. Therefore, the thin film AMA manufactured by using semiconductor technology has been developed.

The thin film AMA is disclosed in U.S. patent application Ser. No. 08/336,021, entitled "THIN FILM ACTUATED MIRROR ARRAY USED IN AN OPTICAL PROJECTION SYSTEM AND METHOD FOR THE MANUFACTURE THEREOF," which is now pending in USPTO and is subject to an obligation to the assignee of this application.

FIG. 2 shows a cross-sectional view of the thin film AMA. Referring to FIG. 2, the thin film AMA has an active matrix 31, an actuator 33 formed on the active matrix 31, and a mirror 35 installed on the actuator 33. The active matrix 31 has a substrate 37, M×N (wherein M, N are integers) number of transistors (not shown) which are installed in the substrate 37, and M×N (wherein M, N are integers) number of connecting terminals 39 respectively formed on the transistors.

The actuator 33 has a supporting member 41 formed on the active matrix 31 which includes connecting terminal 39, a first electrode 43 having a bottom of first portion thereof attached to the supporting member 41 and having a second portion formed parallel to the active matrix 31, a conduit 49 formed in the supporting member 41 so as to connect connecting terminal 39 to the first electrode 43, an active layer 45 formed on the first electrode 43, a second electrode 47 formed on the active layer 45, a spacing member 51 formed at first portion of the second electrode 47, and a supporting layer 53 having a bottom of first portion thereof attached to the spacing member 51 and having a second portion formed parallel to the second electrode 47. The mirror 35 is installed on the supporting layer 53.

A manufacturing method of the thin film AMA will be described below. FIGS. 3A to 3D illustrate manufacturing steps of the thin film AMA. In FIGS. 3A to 3D, the same reference numerals are used for the same elements in FIG. 2.

Referring to FIG. 3A, at first, the active matrix 31 which includes the substrate 37 in which M×N number of transistors (not shown) are formed and M×N number of connecting terminals 39 respectively formed on the transistors is provided. Subsequently, after a first sacrificial layer 55 is formed on the active matrix 31, the first sacrificial layer 55 is patterned to expose a portion of the active matrix 31 where the connecting terminal 39 is formed. The first sacrificial layer 55 can be removed by using an etching method or by means of chemicals.

Referring to FIG. 3B, the supporting member 41 is formed on the exposed portion of the active matrix 31 by a sputtering method or a chemical vapor deposition (CVD) method. Next, after a hole is formed through supporting member 41, the conduit 49 is formed in the supporting member 41 by filling the hole with an electrically conductive material, for example tungsten (W). The conduit 49 electrically connects the connecting terminal 39 to the first electrode 43 which is successively formed. The first electrode 43 is formed on the supporting member 41 and on the first sacrificial layer 55 by using an electrically conductive material such as gold (Au) or silver (Ag). The active layer 45 is formed on the first electrode 43 by using a piezoelectric material, for example lead zirconate titanate (PZT). The second electrode 47 is formed on the active layer 45 by using an electrically conductive material such as gold (Au) or silver (Ag).

The transistor installed in the active matrix 31 converts a picture signal which is caused by an incident light from a light source into a signal current. The signal current is applied to the first electrode 43 through the connecting terminal 39 and the conduit 49. At the same time, a bias current from a common line (not shown) formed on the bottom of the active matrix 31 is applied to the second electrode 47, so an electric field is generated between the second electrode 47 and the first electrode 43. The active layer 45 formed between the second electrode 47 and the first electrode 43 is actuated according to the electric field.

Referring to FIG. 3C, after a second sacrificial layer 57 is formed on the second electrode 47, the second sacrificial layer 57 is patterned to expose a portion of the second electrode 47 adjacent to a portion under which the supporting member 41 is formed. After the spacing member 51 is formed at the exposed portion, the supporting layer 53 is formed on the second sacrificial layer 57 and on the spacing member 51. Also, the mirror 35 for reflecting the incident light is formed on the supporting layer 53.

Referring to FIG. 3D, the mirror 35, the supporting layer 53, the second electrode 47, the active layer 45 and the first electrode 43 are sequentially patterned so that M×N number of pixels having predetermined shapes are formed. Consequently, after the first sacrificial layer 55 and the second sacrificial layer 57 are removed, pixels are rinsed and dried in order to complete the thin film AMA.

However, in the above-described thin film AMA, the tilting angle of the actuator installed therein is limited because the actuator having one active layer is deformed in order to reflect the incident light from a light source by using the mirror mounted on the actuator. So, the light efficiency of the light reflected by the mirror is decreased and the contrast of the picture projected onto a screen is also decreased. In addition, the distance between the light source and the screen is narrower due to the limited tilting angle of the actuator.

SUMMARY OF THE INVENTION

Accordingly, considering the problems as described above, it is a first object of the present invention to provide a thin film actuated mirror array in an optical projection system having a reflecting member and an actuator including a plurality of actuating portions in which adjacent actuating portions are actuated in the opponent directions one after another so as to increase the tilting angle of reflecting member installed on the actuator even though the thin film actuated mirror array has a small volume.

Also, it is a second object of the present invention to provide a method for manufacturing the above thin film actuated mirror array in an optical projection system.

To accomplish the above first object, there is provided in the present invention a thin film actuated mirror array in an optical projection system actuated by a first signal and a second signal. The thin film actuated mirror array in an optical projection system has a substrate, an actuator formed on the substrate, and a reflecting member formed on the actuator. The substrate has an electrical wiring and a connecting terminal for receiving the first signal from outside and for transmitting the first signal. The actuator has a first actuating portion and a second actuating portion.

The first actuating portion has a first bottom electrode formed on the substrate for receiving the first signal, a first top electrode corresponding to the first bottom electrode for receiving the second signal and generating an electric field between the first top electrode and the first bottom electrode, and a first active layer formed between the first top electrode and the first bottom electrode and deformed by the electric field.

The second actuating portion connected to the first actuating portion has a second bottom electrode formed above the substrate for receiving the second signal, a second top electrode corresponding to the second bottom electrode for receiving the first signal and generating an electric field between the second top electrode and the second bottom electrode, and a second active layer formed between the second top electrode and the second bottom electrode and deformed by the electric field.

The actuator also has a first connecting member for connecting the first bottom electrode to the second top electrode, and a second connecting member for connecting the first top electrode to the second bottom electrode.

The second actuating portion is actuated in a direction opponent to that of the first actuating portion. The second active layer is integrally formed with the first active layer.

The reflecting member is formed on the second actuating portion for reflecting a light.

The first bottom electrode and the second bottom electrode are comprised of an electrically conductive metal and the first active layer and the second active layer are comprised of a piezoelectric material or an electrostrictive material. The first top electrode and the second top electrode are comprised of an electrically conductive metal.

Preferably, the first bottom electrode and the second bottom electrode are comprised of platinum, tantalum, or platinum-tantalum alloy. The first active layer and the second active layer may be comprised of $Pb(Zr, Ti)O_3$, $(Pb, La)(Zr, Ti)O_3$, or $Pb(Mn, Nb)O_3$ and the first top electrode and the second top electrode may be comprised of aluminum, platinum, or silver.

Preferably, the first active layer and the second active layer are comprised of ZnO.

The second actuating portion further has a post formed on a portion of the second top electrode for supporting the reflecting member. The reflecting member is comprised of a reflective metal, for example aluminum, platinum, or silver.

The first bottom electrode has an L-shape and the second bottom electrode has a reverse L-shape so that the first bottom electrode and the second bottom electrode together form a U-shape.

The first active layer and the second active layer are connected to form a U-shape.

The first top electrode has an L-shape and the second top electrode has a reverse L-shape which is smaller than the first top electrode.

Preferably, the first connecting member is a first via contact formed from the second top electrode to the first bottom electrode through the first active layer. The second connecting member is a second via contact formed from the first top electrode to the second bottom electrode through the second active layer. The first via contact and the second via contact are comprised of an electrically conductive metal, for example tungsten or titanium. Preferably, the actuator has a U-shape.

In order to accomplish the above second object, there is provided in the present invention a method for manufacturing a thin film actuated mirror array in an optical projection system actuated by a first signal and a second signal. The method for manufacturing the thin film actuated mirror array in an optical projection system comprises the steps of:

providing a substrate having an electrical wiring and a connecting terminal for receiving a first signal from outside and transmitting the first signal;

forming a bottom electrode layer on the substrate and patterning the bottom electrode layer to form a first bottom electrode for receiving the first signal and to form a second bottom electrode for receiving the second signal;

forming an active layer on the first bottom electrode and on the second bottom electrode and patterning the active layer to form a first active layer and to form a second active layer, the first active layer being deformed by a first electric field, the second active layer being deformed by a second electric field generated in a direction opponent to the first electric field;

forming a top electrode layer on the first active layer and on the second active layer and patterning the top electrode layer to form a first top electrode for receiving the second signal and generating the first electric field and to form a second top electrode for receiving the first signal and generating the second electric field;

forming a first connecting member for connecting the first bottom electrode to the second top electrode;

forming a second connecting member for connecting the first top electrode to the second bottom electrode; and forming a reflecting member for reflecting a light on the second top electrode.

The step of forming the bottom electrode layer is preferably performed after forming a sacrificial layer on the substrate and patterning the sacrificial layer in order to expose a portion of the substrate adjacent to the connecting terminal. The step of forming the sacrificial layer is performed by an atmospheric pressure chemical vapor deposition method, a sputtering method, or an evaporation method by using phosphor-silicate glass, a metal, or an oxide. The step of forming the sacrificial layer may further comprise the step of planarizing the sacrificial layer by using a spin-on-glass (SOG) or by a chemical mechanical polishing method.

The step of forming the bottom electrode layer may be performed by a sputtering method or a chemical vapor deposition method by using platinum, tantalum, or platinum-tantalum alloy. The step of forming the top electrode layer may be performed by a sputtering method or a chemical vapor deposition method by using aluminum, platinum, or silver.

The step of forming the active layer may be performed by a sol-gel method, a sputtering method, or a chemical vapor deposition method by using ZnO, $Pb(Zr, Ti)O_3$, $(Pb, La)(Zr, Ti)O_3$, or $Pb(Mn, Nb)O_3$. The step of forming the reflecting member may be performed by a sputtering method or an evaporation method by using aluminum, platinum, or silver.

The step of forming the first connecting member is performed after forming a first via hole by etching the second top electrode and the first active layer, and the step of forming the second connecting member is performed after forming a second via hole by etching the first top electrode and the second active layer.

In the thin film AMA according to the present invention, the first signal, that is the picture current signal, is applied to the first bottom electrode via the electrical wiring, the connecting terminal and the plug. At the same time, the second signal, that is the bias current signal, is applied to the first top electrode from the common line. Thus, an electric field is generated between the first top electrode and the first bottom electrode. The first active layer, which is formed between the first top electrode and the first bottom electrode, is deformed by such an electric field. The first active layer is deformed in a direction perpendicular to the electric field. In this case, the first active layer is actuated in the direction opponent to the position where the first bottom electrode is positioned. That is, the first active layer is actuated upward by a predetermined tilting angle.

At that time, the first signal is transmitted to the second top electrode via the first connecting member and the second signal is transmitted to the second bottom electrode via the second connecting member. Thus, an electric field is generated between the second top electrode and the second bottom electrode. The electric field is reverse of what is generated between the first top electrode and the first bottom electrode. The second active layer which is formed between the second top electrode and the second bottom electrode is deformed by the reverse electric field. The second active layer is deformed in a direction perpendicular to the electric field. In this case, the second active layer is actuated in the opponent direction to the position where the second top electrode is positioned. That is, the second active layer is actuated downward. The tilting angle of the second active layer is equal to that of the first active layer.

If the tilting angle of the first active layer is θ, the first actuating portion having the first active layer is actuated upward by a tilting angle of θ. Also, the second actuating portion having the second active layer is actuated downward by a tilting angle of θ. When the first actuating portion is actuated upward, the second actuating portion connected to the first actuating portion is actuated upward together with the first actuating portion. At this state, the second actuating portion having the second active layer is actuated downward by a tilting angle of θ because the second active layer is actuated downward.

Therefore, the final tilting angle of the second actuating portion is equal to 2θ. The reflecting member for reflecting an incident light from a light source tilts by an angle of 2θ because the reflecting member is formed on the second actuating portion.

Therefore, the thin film AMA in an optical projection system according to the present invention has a reflecting member and an actuator including a plurality of actuating portions in which adjacent actuating portions are actuated in opponent directions one after another, so the tilting angle of the reflecting members mounted on actuators is two times bigger than that of the conventional thin film AMA even though the thin film AMA according to the present invention has a small volume. Hence, the light efficiency of the light reflected by the reflecting member increases and the contrast of the picture projected onto a screen also increases. Furthermore, the distance between the light source and the screen is wider because the tilting angle of the reflecting member is bigger.

BRIEF DESCRIPTION OF THE DRAWINGS

The above objects and advantages of the present invention will become more apparent by describing in detail preferred embodiments thereof with reference to the attached drawings, in which:

FIG. 2 is a cross-sectional view for showing a thin film AMA described in a prior application of the assignee of this application;

FIGS. 3A to 3D illustrate manufacturing steps of the thin film AMA illustrated in FIG. 2;

DETAILED DESCRIPTION OF THE INVENTION

Hereinafter, the preferred embodiments of the present invention will be explained in more detail with reference to the accompanying drawings.

EMBODIMENT 1

Figure 1:
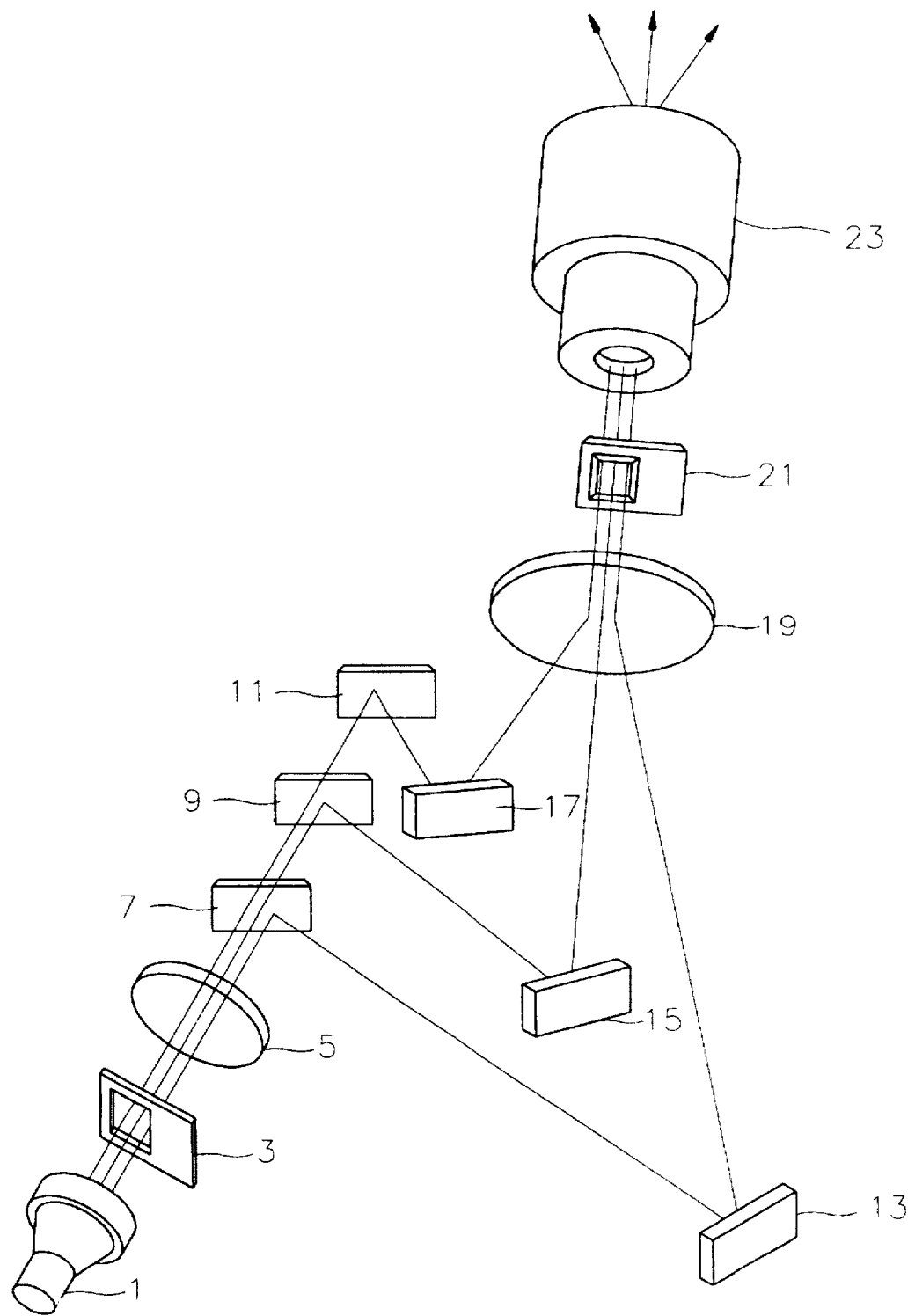
FIG. 1 is a schematic view for showing an engine system of a conventional AMA.
Figure 3A:
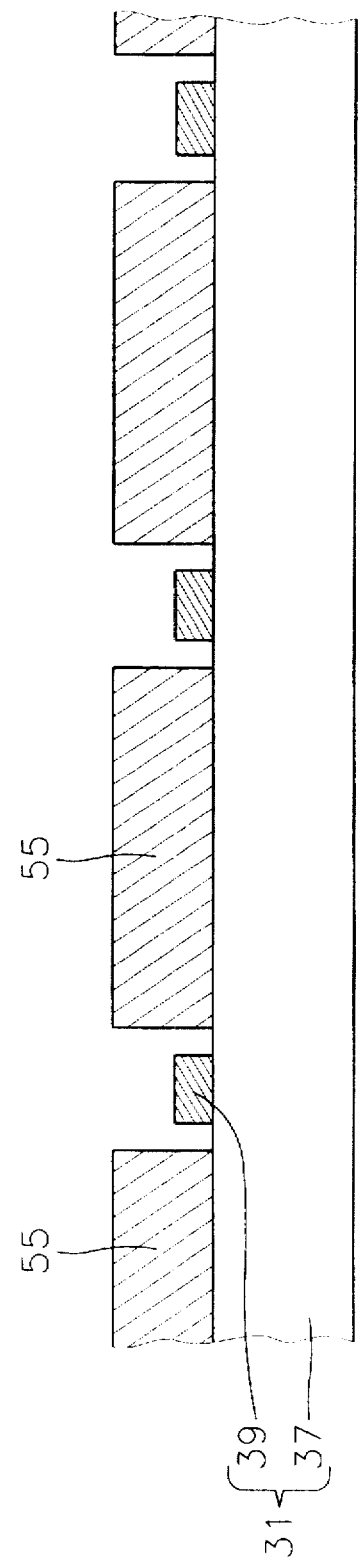
Figure 3B:
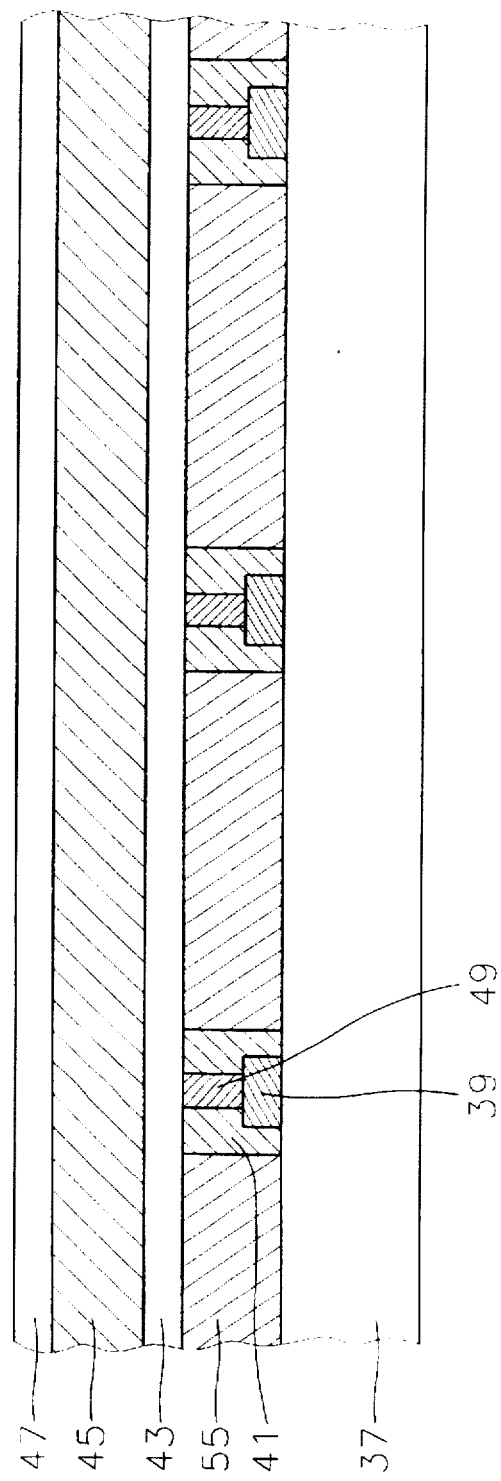
Figure 3C:
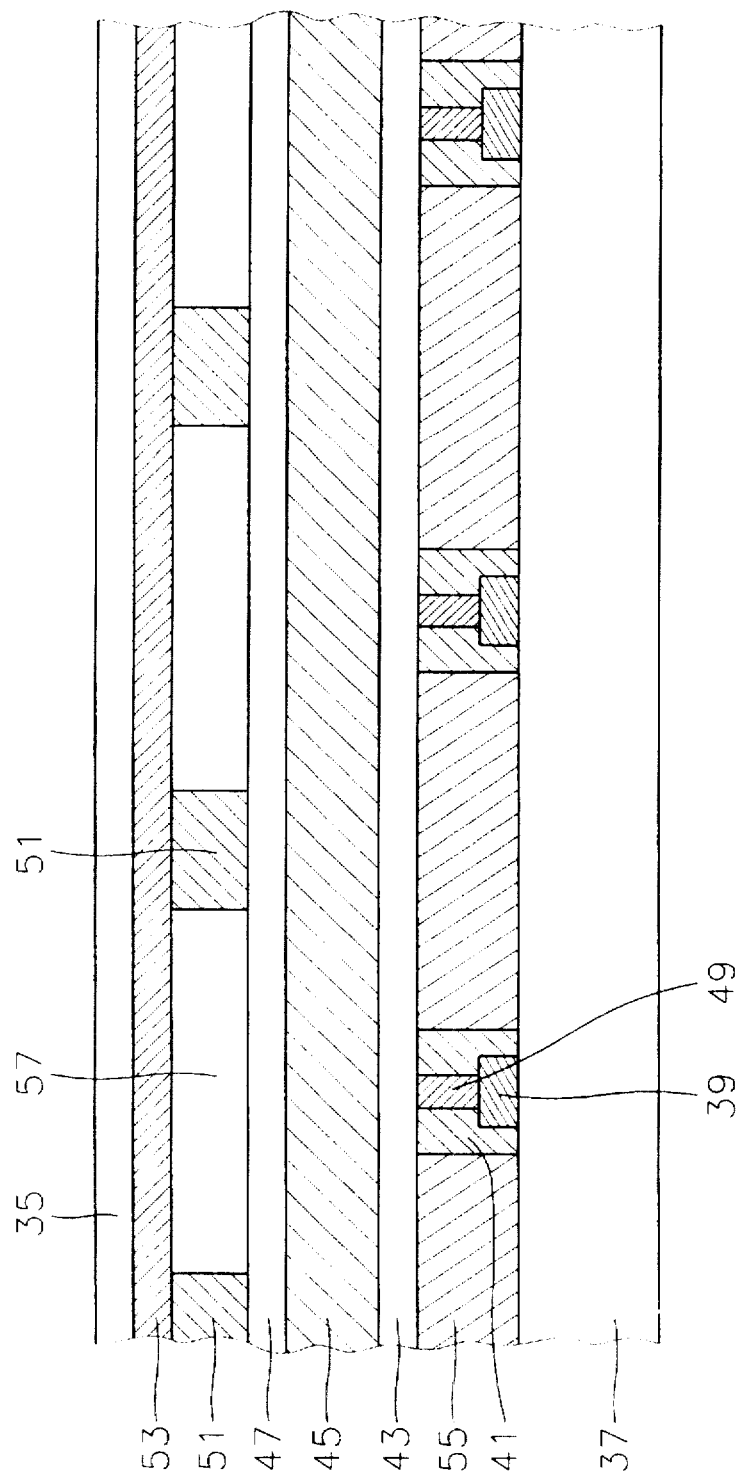
Figure 4:
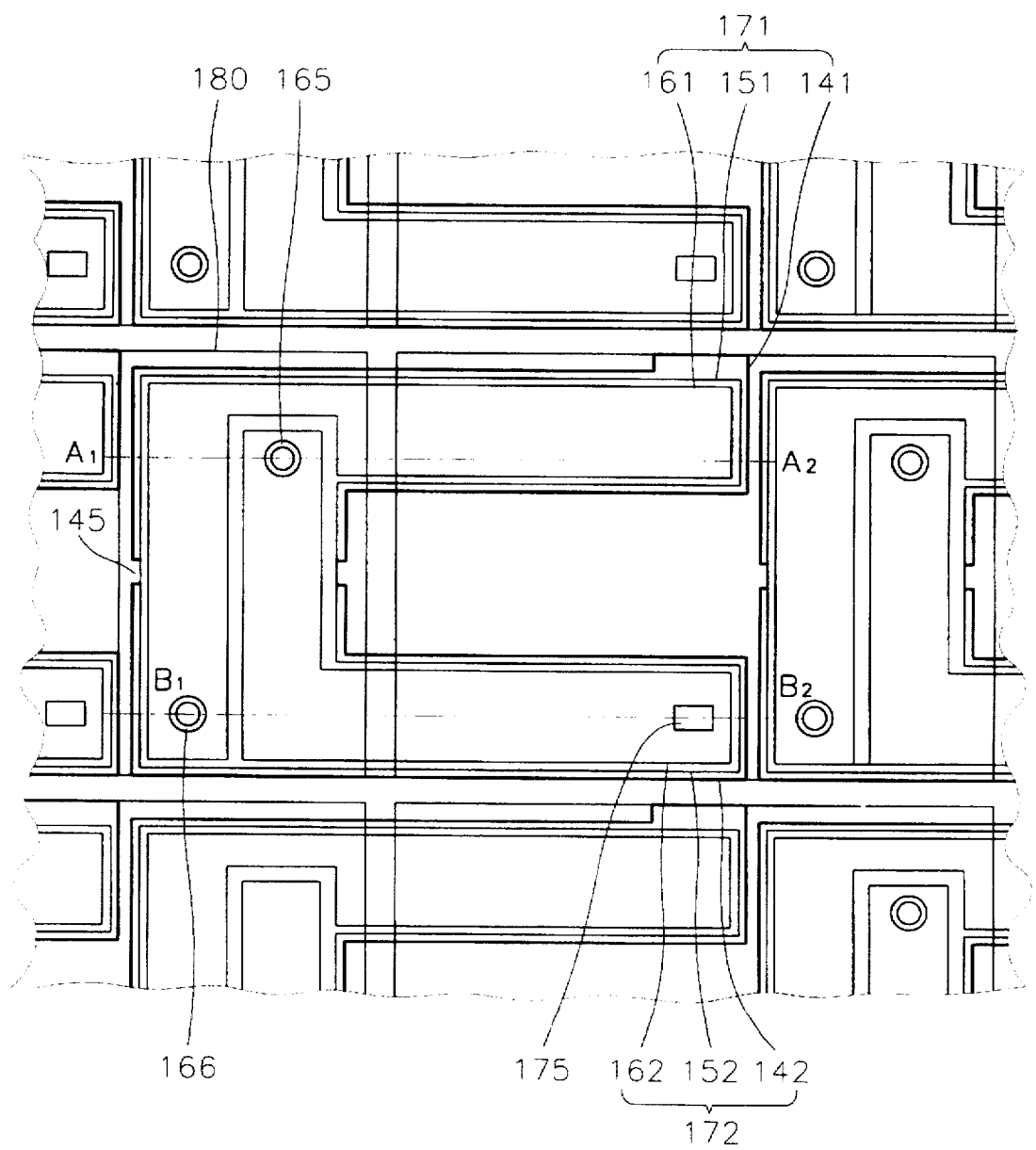
FIG. 4 is a plan view for showing a thin film AMA in an optical projection system according to a first embodiment of the present invention.
Figure 5:
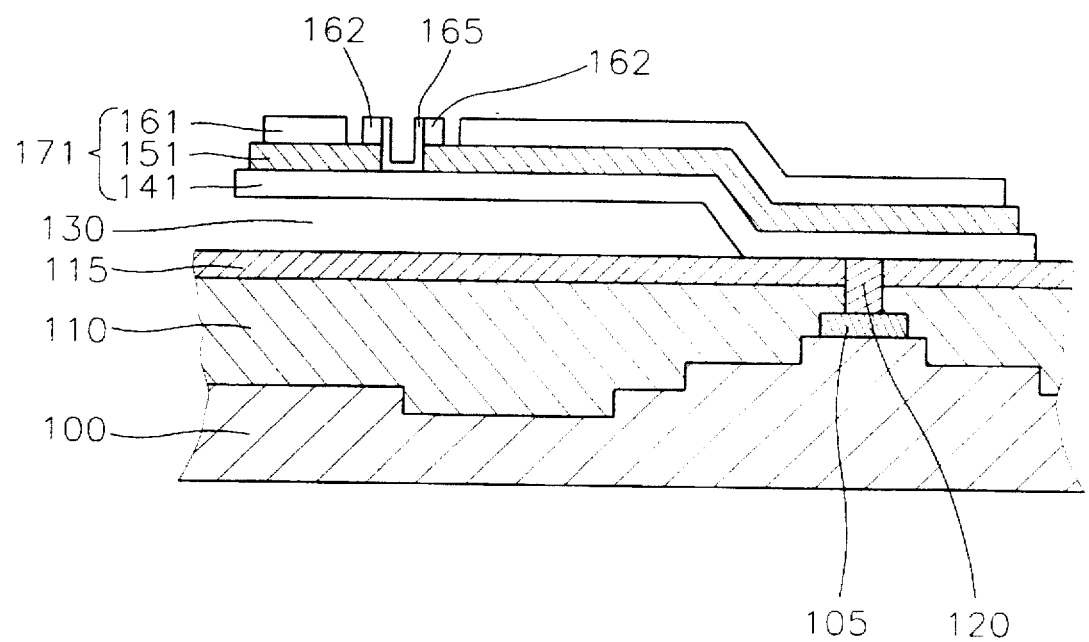
FIG. 5 is a cross-sectional view taken along line $A_1$–$A_2$ of FIG. 4.
Figure 6:
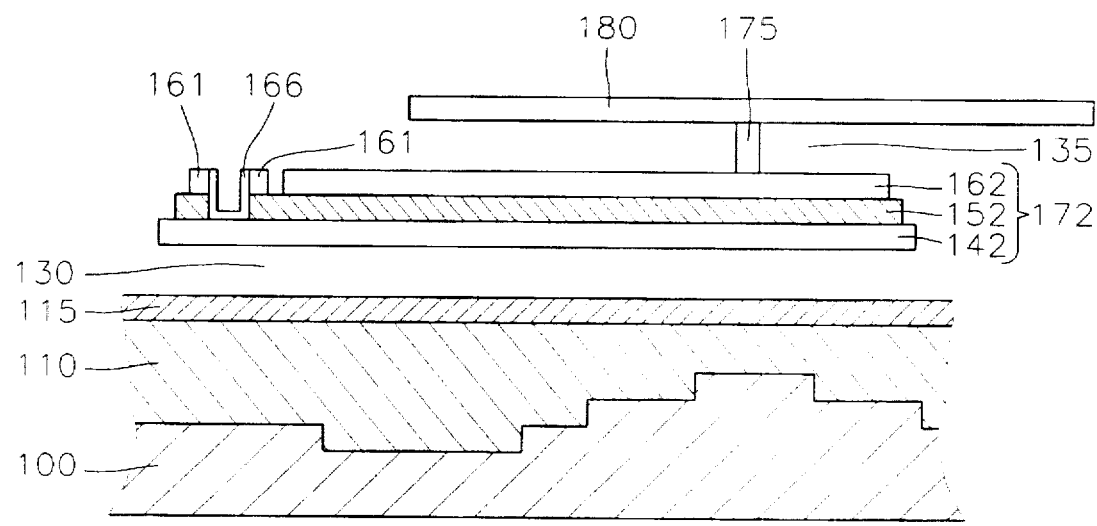
FIG. 6 is a cross-sectional view taken along line $B_1$–$B_2$ of FIG. 4.

FIG. 4 is a plan view for showing a thin film AMA in an optical projection system according to a first embodiment of the present invention. FIG. 5 is a cross-sectional view taken along line $A_1-A_2$ of FIG. 4, and FIG. 6 is a cross-sectional view taken along line $B_1-B_2$, of FIG. 4.

Referring to FIG. 4, the thin film AMA in an optical projection system according to the present embodiment, has a substrate 100, an actuator 170 formed on the substrate 100, and a reflecting member 180 installed on the actuator 170.

The actuator 170 has a first actuating portion 171 formed on a first portion of the substrate 100 and a second actuating portion 172 formed above a second portion of the substrate 100. The second actuating portion 172 is integrally formed with the first actuating portion 171. The actuator 170 having the first actuating portion 171 and the second actuating portion 172 has a U-shape.

The reflecting member 180 is supported by a post 175 formed on a first portion of the second actuating portion 172. The actuator 170 is covered with the reflecting member 180. Preferably, the reflecting member 180 is a mirror.

Referring to FIG. 5, the substrate 100 on which an electrical wiring (not shown) is formed has a connecting terminal 105 formed on the electrical wiring, a passivation layer 110 overlaid on the substrate 100 and on the connecting terminal 105, an etch stop layer 115 overlaid on the passivation layer 110, and a plug 120 formed from the etch stop layer 115 to the connecting terminal 105 through the passivation layer 110. Preferably, the electrical wiring has a metal oxide semiconductor (MOS) for switching operation.

The first actuating portion 171 has a first bottom electrode 141 having a bottom of a first portion attached to a portion of the etch stop layer 115 under which the plug 120 and the connecting terminal 105 are formed and having a second portion formed parallel to and above the etch stop layer 115, a first active layer 151 formed on the first bottom electrode 141, and a first top electrode 161 formed on the first active layer 151. A first air gap 130 is interposed between the etch stop layer 115 and the second portion of the first bottom electrode 141.

Referring to FIG. 6, the second actuating portion 172 has a second bottom electrode 142 which is formed parallel to and above the etch stop layer 115, a second active layer 152 formed on the second bottom electrode 142, and a second top electrode 162 formed on the second active layer. The first air gap 130 is interposed between the etch stop layer 115 and the second bottom electrode 142.

Referring to FIG. 4, a first via contact 165 is formed on a first portion of the first actuating portion 171 in order to connect the first bottom electrode 141 to the second top electrode extending to the first portion of the first actuating portion 171. Also, a second via contact 166 is formed on a first portion of the second actuating portion 172 in order to connect the second bottom electrode 142 to the first top electrode 161 extending to the first portion of the second actuating portion 172. The second active layer 152 of the second actuating portion 172 is integrally formed with the first active layer 151 of the first actuating portion 171. The first bottom electrode 141 has an L-shape and the second bottom electrode 142 has a reverse L-shape so that the first bottom electrode 141 and the second bottom electrode 142 together form a U-shape. A portion of the first active layer 151 is connected to a portion of the second active layer 152 so that the first active layer 151 and the second active layer 152 form a U-shape. The first top electrode 161 has an L-shape and the second top electrode 162 has a reverse L-shape which is smaller than the first top electrode 161.

The post 175 is formed on a first portion of the second top electrode 162 of the second actuating portion 172. A central portion of the reflecting member 180 is supported by the post 175. A first portion of the reflecting member 180 is formed parallel to and above the second top electrode 162. A second air gap 135 is interposed between the second top electrode 162 and the first portion of the reflecting member 180. A second portion of the reflecting member 180 partially covers a portion of adjacent actuator. Preferably, the reflecting member 180 has a rectangular shape.

A method for manufacturing the thin film AMA in an optical projection system according to the present embodiment will be described as follows.

FIGS. 7 to 10C illustrate manufacturing steps of the thin film AMA according to the present embodiment.

Figure 7:
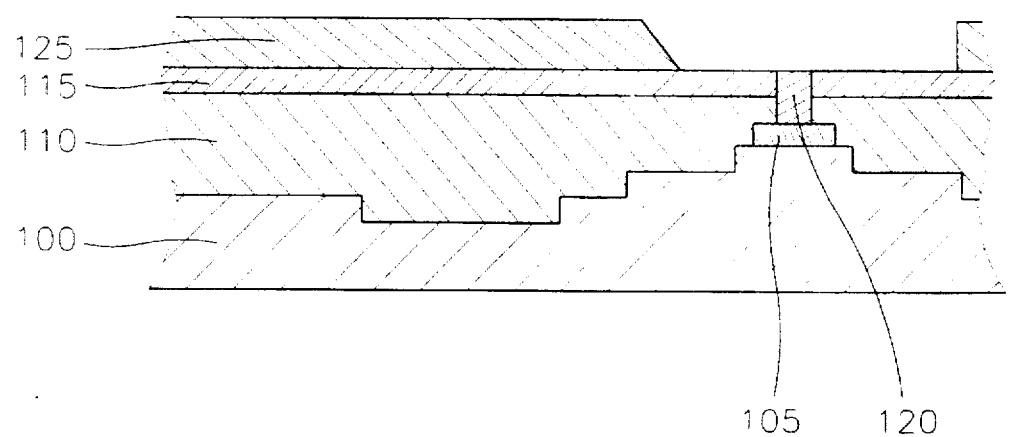
FIGS. 7 to 10C illustrate manufacturing steps of the thin film AMA in an optical projection system according to the first embodiment of the present invention.

Referring to FIG. 7, the connecting terminal 105 corresponding to the electrical wiring (not shown) is formed on the substrate 100. Preferably, the electrical wiring has a metal oxide semiconductor (MOS) transistor for switching operation. The connecting terminal 105 is formed by using a metal, for example tungsten (W). The connecting terminal 105 is electrically connected to the electrical wiring. The electrical wiring and the connecting terminal 105 receive a first signal from outside and transmit the first signal to the first bottom electrode 141. The first signal is a picture current signal.

The passivation layer 110 is overlaid on the connecting terminal 105 and on the substrate 100 by using phosphor-silicate glass (PSG). The passivation layer 110 is formed by a chemical vapor deposition (CVD) method so that the passivation layer 110 has a thickness of between about 0.1 µm and 1.0 µm. The passivation layer 110 protects the substrate 100 having the electrical wiring and the connecting terminal 105 during subsequent manufacturing steps.

The etch stop layer 115 is overlaid on the passivation layer 110 by using a nitride so that the etch stop layer 115 has a thickness of between about 1000 Å and 2000 Å. The etch stop layer 115 is formed by a low pressure chemical vapor deposition (LPCVD) method. The etch stop layer 115 protects the passivation layer 110 and the substrate 100 during successive etching steps.

After portions of the etch stop layer 115 and the passivation layer 110 are etched from a portion of the etch stop layer where the connecting terminal 105 is formed, the plug 120 is formed in portions of the etch stop layer 115 and the passivation layer 110 by using an electrically conductive metal such as tungsten (W) or titanium (Ti). The plug 120 is formed by a sputtering method or a CVD method. The plug 120 is electrically connected to the connecting terminal 105. Thus, the first signal is applied to the first bottom electrode 141 which is successively formed through the electrical wiring, the connecting terminal 105, and the plug 120.

A sacrificial layer 125 is overlaid on the etch stop layer 115 and on the plug 120 by using PSG, a metal, or an oxide. The sacrificial layer 125 is formed by an atmospheric pressure CVD (APCVD) method, a sputtering method, or an evaporation method so that the sacrificial layer 125 has a thickness of between about 0.5 µm and 2.0 µm. In this case, the degree of flatness of the sacrificial layer 125 is poor because the sacrificial layer 125 covers the top of the substrate 100 having the electrical wiring and the connecting terminal 105. Therefore, the surface of the sacrificial layer 125 is planarized by using a spin on glass (SOG) or by a chemical mechanical polishing (CMP) method. Subsequently, a first portion of the sacrificial layer 125 under which the connecting terminal 105 is formed is patterned in order to expose a portion of the etch stop layer 115 where the plug 120 is formed.

Figure 8A:
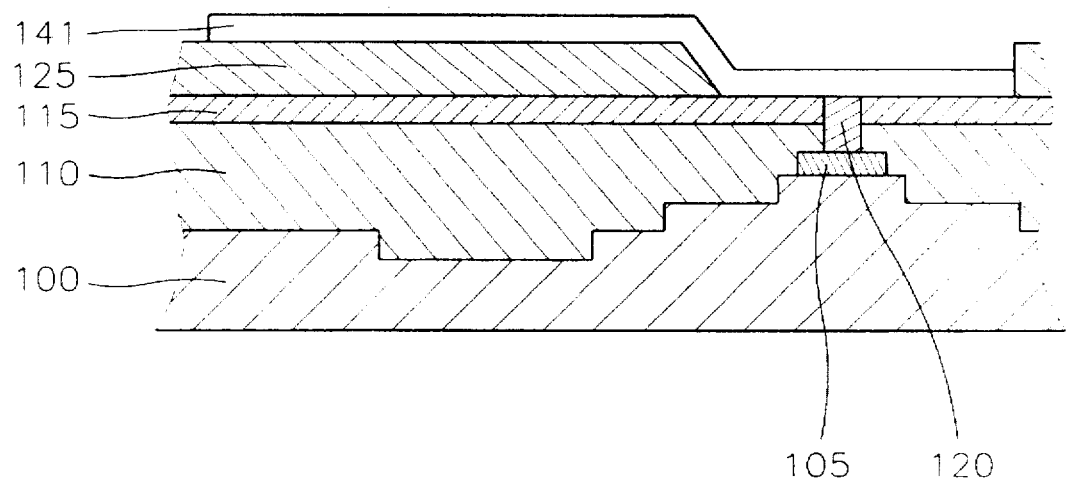
Figure 8B:
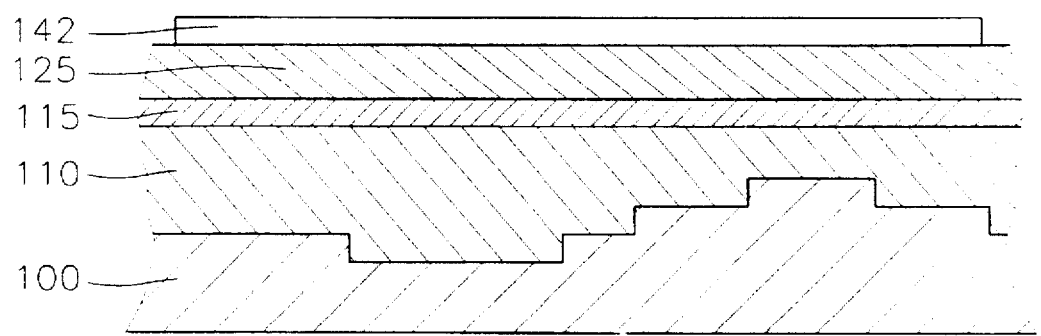
Figure 8C:
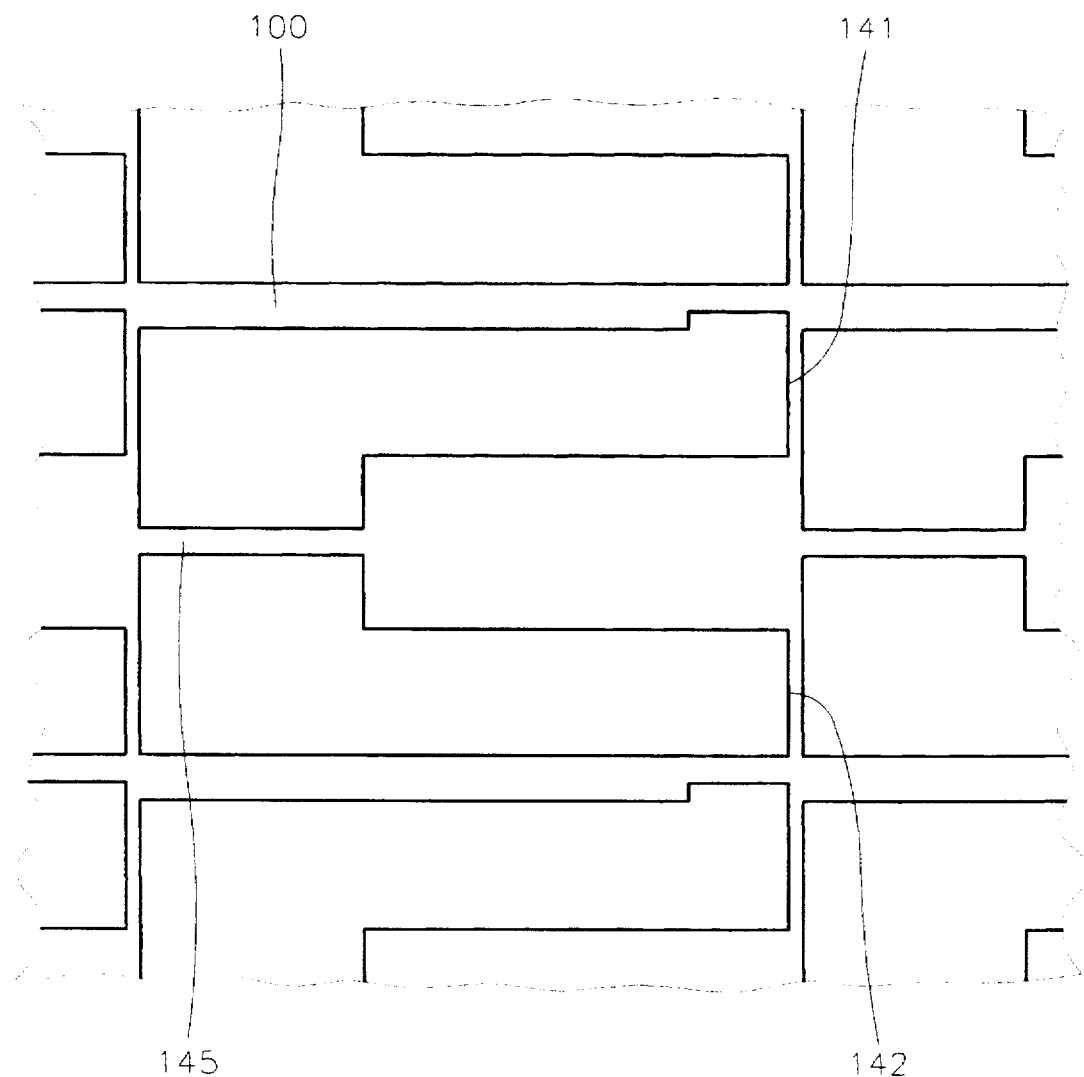

Referring to FIGS. 8A to 8C, a bottom electrode layer 140 is overlaid on the exposed portion of the etch stop layer 115 and on the sacrificial layer 125. The bottom electrode layer 140 is formed by using an electrically conductive metal such as platinum (Pt), tantalum (Ta), or a platinum-tantalum (Pt—Ta) alloy. The bottom electrode layer 140 is formed by a sputtering method or a CVD method so that the bottom electrode layer 140 has a thickness of between about 0.1 µm and 1.0 µm. Subsequently, the bottom electrode layer 140 is patterned so as to form the first bottom electrode 141 and the second bottom electrode 142. At the same time, an iso-cutting 145 (that is isotropically cut portion) is formed between the first bottom electrode 141 and the second bottom electrode 142 so as to shorten the first bottom electrode 141 and the second bottom electrode 142, as shown in FIG. 8C. So, the first bottom electrode 141 has an L-shape and the second bottom electrode 142 has a reverse L-shape so that the first bottom electrode 141 and the second bottom electrode 142 together form a U-shape.

Figure 9A:
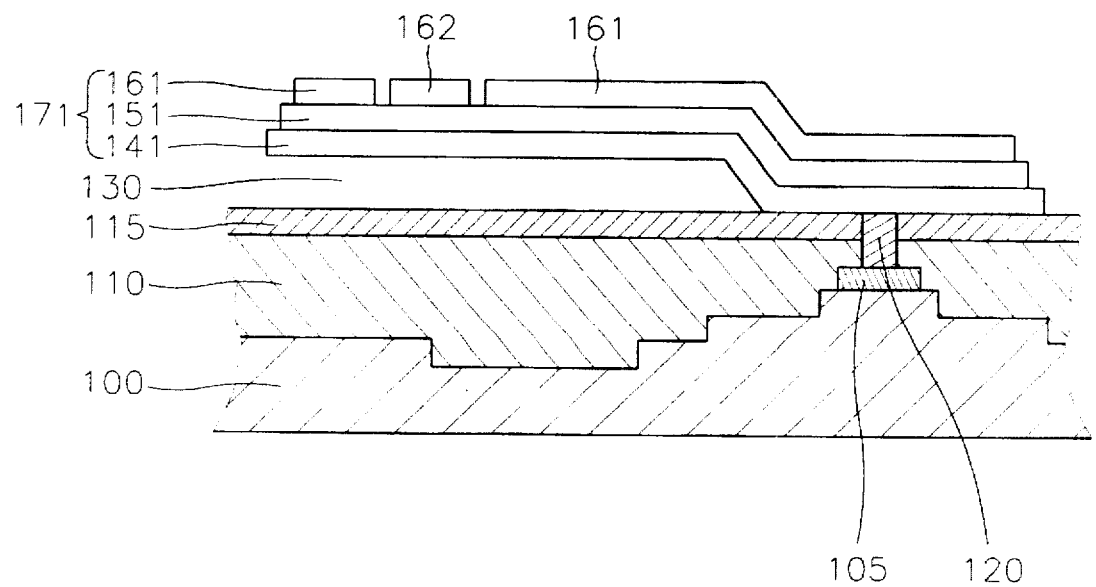
Figure 9B:
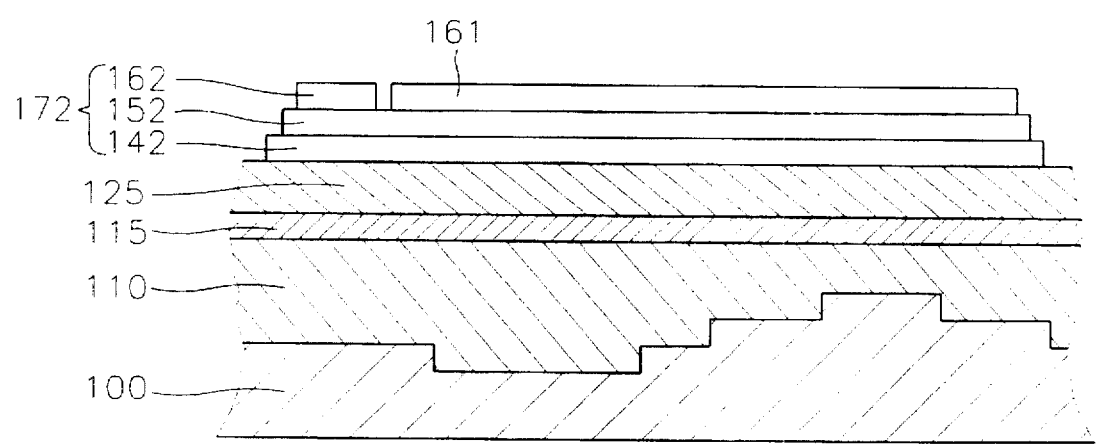
Figure 9C:
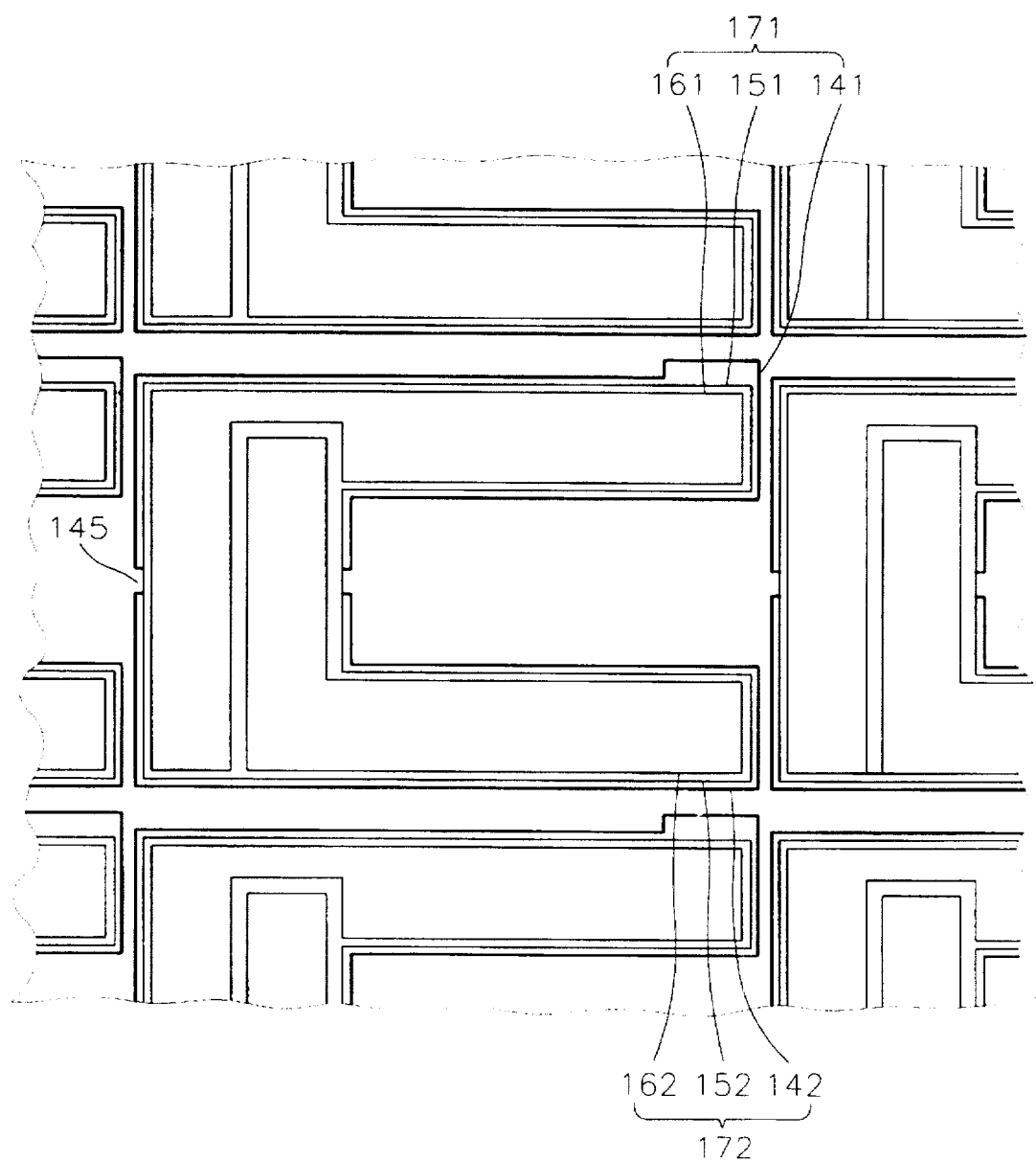

Referring to FIGS. 9A to 9C, an active layer 150 is overlaid on the first bottom electrode 141 and on the second bottom electrode 142. The active layer 150 is formed by using a piezoelectric material such as ZnO, PZT (Pb(Zr, Ti)O$_3$), or PLZT ((Pb, La)(Zr, Ti)O$_3$) so that the active layer 150 has a thickness of between about 0.1 µm and 1.0 µm. Also, the active layer 150 is formed by using an electrostrictive material such as PMN (Pb(Mg, Nb)O$_3$). When the active layer 150 is manufactured by using ZnO, the active layer 150 is formed at a low temperature of between 300° C. and 600° C. Hence, a thermal attack in the substrate 100 may be decreased. After the active layer 150 is formed by a sol-gel method, a sputtering method, or a CVD method, the active layer 150 is annealed by a rapid thermal annealing (RTA) method. Then, the active layer 150 is polled. In this case, the polling step is needless when the active layer 150 is manufactured by using ZnO because the active layer 150 comprised of ZnO is polled by an electric field generated according to the first signal and a second signal. The active layer 150 is patterned so as to form the first active layer 151 and the second active layer 152, as shown in FIG. 9C. At that time, the first active layer 151 and the second active layer 152 are connected to form a U-shape.

A top electrode layer 160 is overlaid on the first active layer 151 and on the second active layer 152. The top electrode layer 160 is formed by using an electrically conductive metal, for example aluminum (Al), platinum, or silver (Ag). The top electrode layer 160 is formed by a sputtering method or a CVD method so that the top electrode layer 160 has a thickness of between about 0.1 µm and 1.0 µm. Subsequently, as shown in FIG. 9C, the top electrode layer 160 is patterned so as to form the first top electrode 161 and the second top electrode 162 in such a manner that the first actuating portion 171 and the second actuating portion 172 are formed. The first top electrode 161 has an L-shape and the second top electrode 162 has a reverse L-shape which is smaller than the first top electrode 161. The second signal is applied to the first top electrode 161 from a common line (not shown). The second signal is a bias current signal.

Figure 10A:
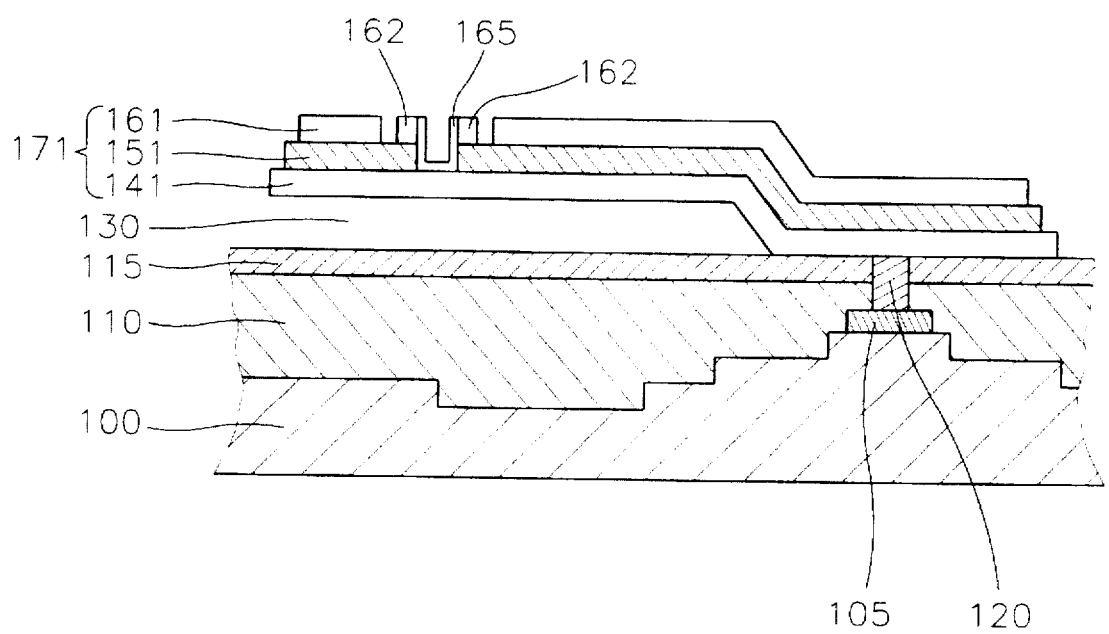
Figure 10B:
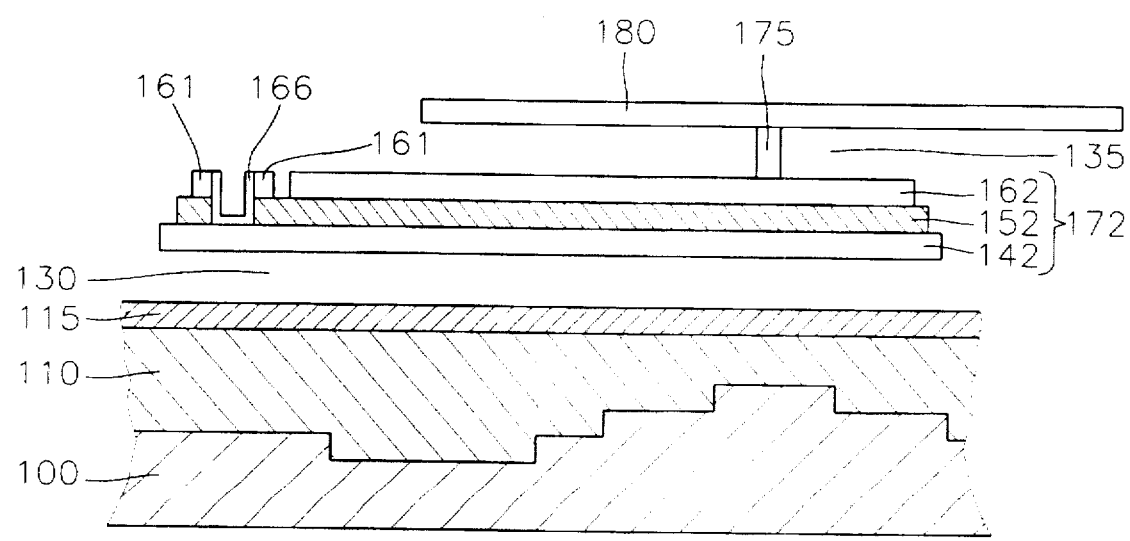
Figure 10C:
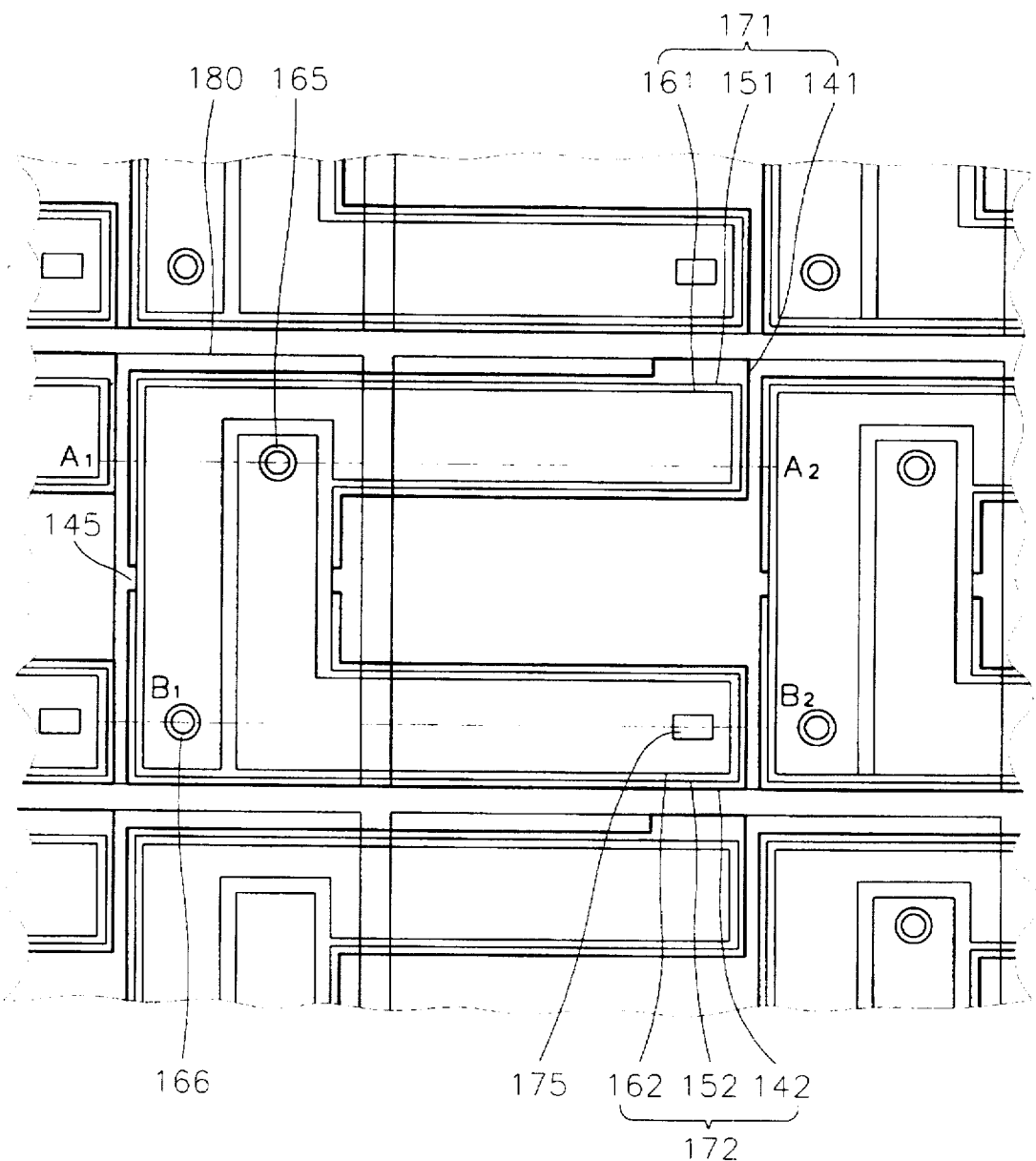

Referring to FIGs. 10A to 10C, a first via hole is formed by etching the second top electrode 162 extending to the first portion of the first actuating portion 171 and by etching the first active layer 151. A first via contact 165 is formed in the first via hole by using a metal, such as tungsten or titanium. The first via contact 165 is formed by a sputtering method and patterned.

A second via hole and a second via contact 166 are formed by the same method as that of the first via hole and the first via contact 165. A second via hole is formed by etching the first top electrode 161 extending to the first portion of the second actuating portion 172 and by etching the second active layer 152. A second via contact 166 is formed in the second via hole by using a metal, such as tungsten or titanium. The second via contact 166 is also formed by a sputtering method and patterned.

The first bottom electrode 141 is connected to the second top electrode 162 extending to the first actuating portion 171 through the first via contact 165. Also, the second bottom electrode 142 is connected to the first top electrode 161 extending to the second actuating portion 172 through the second via contact 166.

The first signal is applied to the first bottom electrode 141 via the electrical wiring, the connecting terminal 105, and the plug 120. Therefore, when the first signal is applied to the first bottom electrode 141, at the same time, the second signal is applied to the first top electrode 161, an electric field is generated between the first top electrode 161 and the first bottom electrode 141. At this time, the first signal which is applied to the first bottom electrode 141 is transmitted to the second top electrode 162 via the first via contact 165. Also, the second signal which is applied to the first top electrode 161 is transmitted to the second bottom electrode 142 via the second via contact 166. Therefore, an electric field is generated between the second top electrode 162 and the second bottom electrode 142. The electric field is reverse of the electric field which is generated between the first top electrode 161 and the first bottom electrode 141. Thus, the first active layer 151 and the second active layer 152 are deformed by such electric fields in opposite directions.

Subsequently, the sacrificial layer 125 is removed by using a vapor of hydrogen fluoride (HF). When the sacrificial layer 125 is removed, the first air gap 130 is formed at the position where the sacrificial layer 125 is positioned. Hence, the first actuating portion 171 and the second actuating portion 172 are completed.

Referring to FIG. 10C, after a photo resist (not shown) is coated on the first actuating portion 171 and on the second actuating portion 172, the photo resist is patterned in order to expose a portion of the second top electrode 162. The post 175 is formed on the exposed portion of the second top electrode 162 and the reflecting member 180 is formed on the post 175 and on the photo resist. The post 175 and the reflecting member 180 are formed by using a reflective metal such as aluminum, platinum, or silver. The post 175 and the reflecting member 180 are formed by a sputtering method or an evaporation method. The reflecting member 180 has a thickness of between about 500 Å and 1000 Å. Preferably, the reflecting member 180 is a mirror. Subsequently, the photo resist is removed by etching. When the photo resist is removed, the second air gap 135 is formed at the position where the photo resist had been positioned. The reflecting member 180 has a shape of plate whose central portion is supported by the post 175. The first portion of the reflecting member 180 is formed parallel to and above the second top electrode 162. The second air gap 135 is interposed between the second top electrode 162 and the first portion of the reflecting member 180. The second portion of the reflecting member 180 is formed to cover the adjacent actuator. Hence, the actuator 170, on which the reflecting member 180 is formed, is completed.

The operation of the thin film AMA in an optical projection system according to the present embodiment will be described.

In the thin film AMA according to the present embodiment, the first signal, that is the picture current signal, is applied to the first bottom electrode 141 via the electrical wiring, the connecting terminal 105, and the plug 120. The first signal is also applied to the second top electrode 162 via the first via contact 165. At the same time, the second signal, that is the bias current signal, is applied to the first top electrode 161 from the common line and the second signal is also applied to the second bottom electrode 142 via the second via contact 166. Thus, electric fields are generated between the first top electrode 161 and the first bottom electrode 141, and between the second top electrode 162 and the second bottom electrode 142. The first active layer 151, which is formed between the first top electrode 161 and the first bottom electrode 141, and the second active layer 152, which is formed between the second top electrode 162 and the second bottom electrode 142, are deformed by electric fields. The first active layer 151 and the second active layer 152 are deformed in directions perpendicular to the electric fields. In this case, the first active layer 151 is actuated in a direction opponent to the position where the first bottom electrode 141 is positioned. The second active layer 152 is actuated in a direction opponent to the position where the second top electrode 162 is positioned. That is, the first active layer 151 is actuated upward and the second active layer 152 is actuated downward. The tilting angle of the first active layer 151 is equal to that of the second active layer 152.

If the tilting angle of the first active layer 151 is θ, the first actuating portion 171 having the first active layer 151 is actuated upward by a tilting angle of θ. Also, the second actuating portion 172 having the second active layer 152 is actuated downward by a tilting angle of θ. When the first actuating portion 171 is actuated upward, the second actuating portion 172 connected to the first actuating portion 171 is actuated upward together with the first actuating portion 171. At this state, the second actuating portion 172 having the second active layer 152 is actuated downward by a tilting angle of θ because the second active layer 162 is actuated downward. Therefore, the final tilting angle of the second actuating portion 172 is equal to 2θ. The reflecting member 180 for reflecting an incident light from a light source tilts by an angle of 2θ because the reflecting member 180 is formed on the second actuating portion 172.

EMBODIMENT 2

Figure 11:
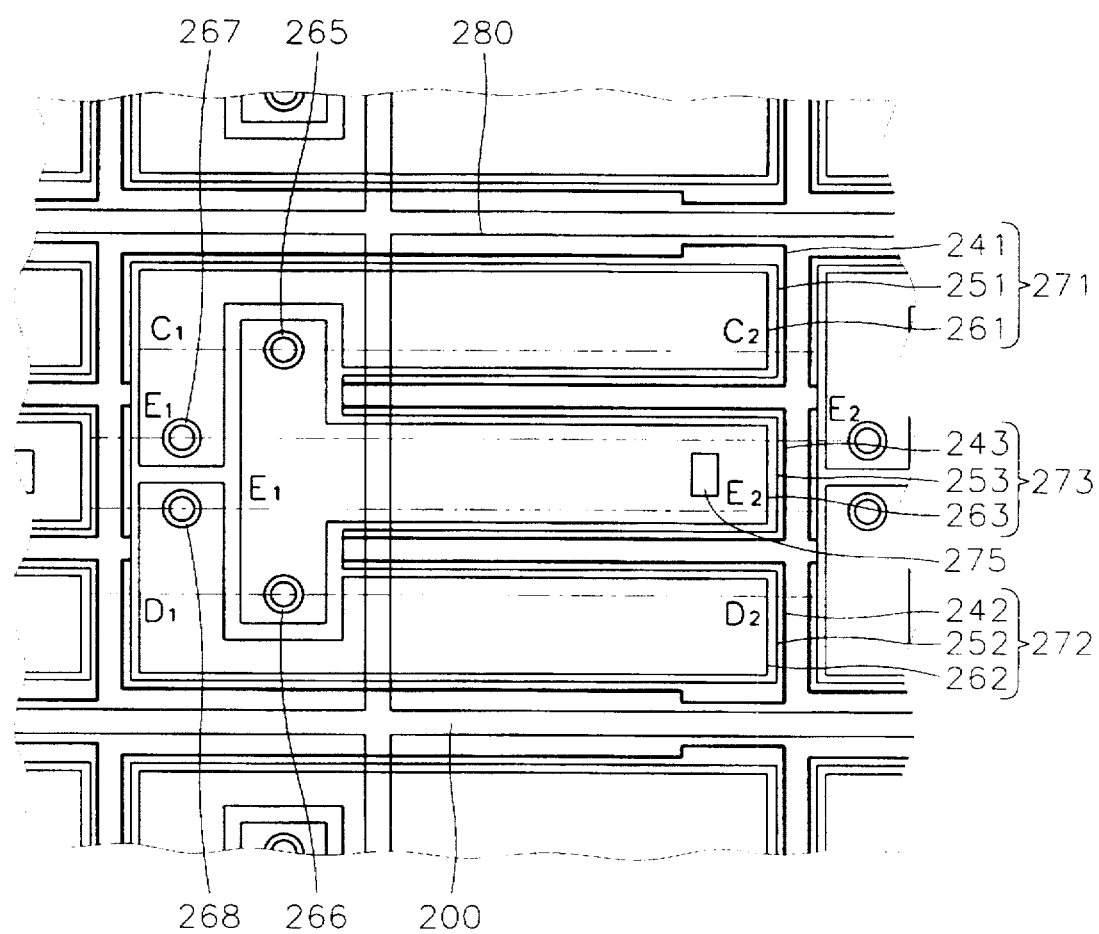
FIG. 11 is a plan view for showing a thin film AMA in an optical projection system according to a second embodiment of the present invention.
Figure 12:
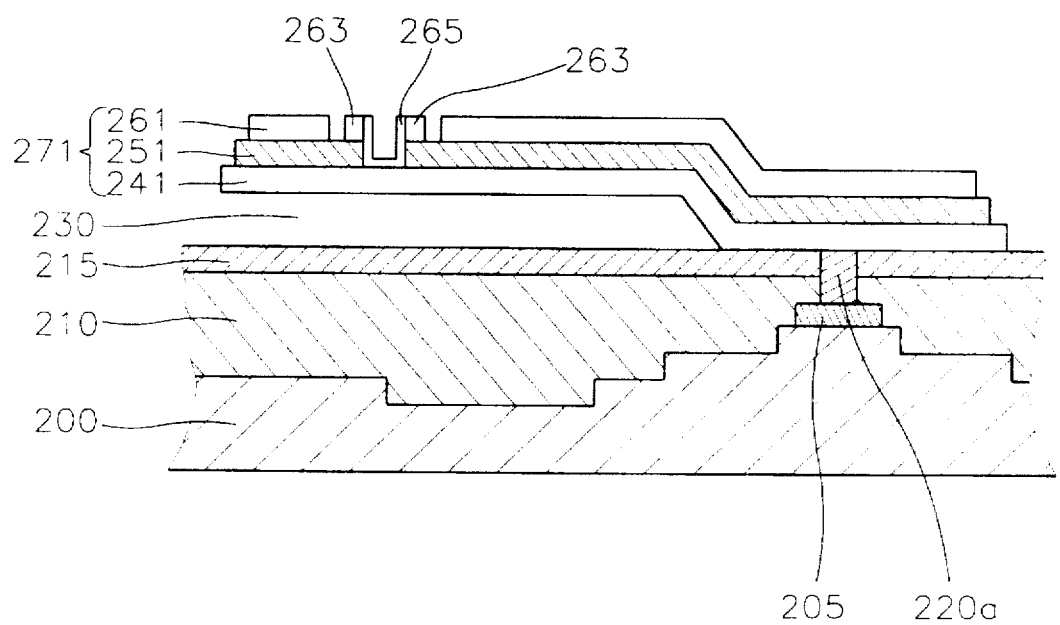
FIG. 12 is a cross-sectional view taken along line $C_1-C_2$ of FIG. 11.
Figure 13:
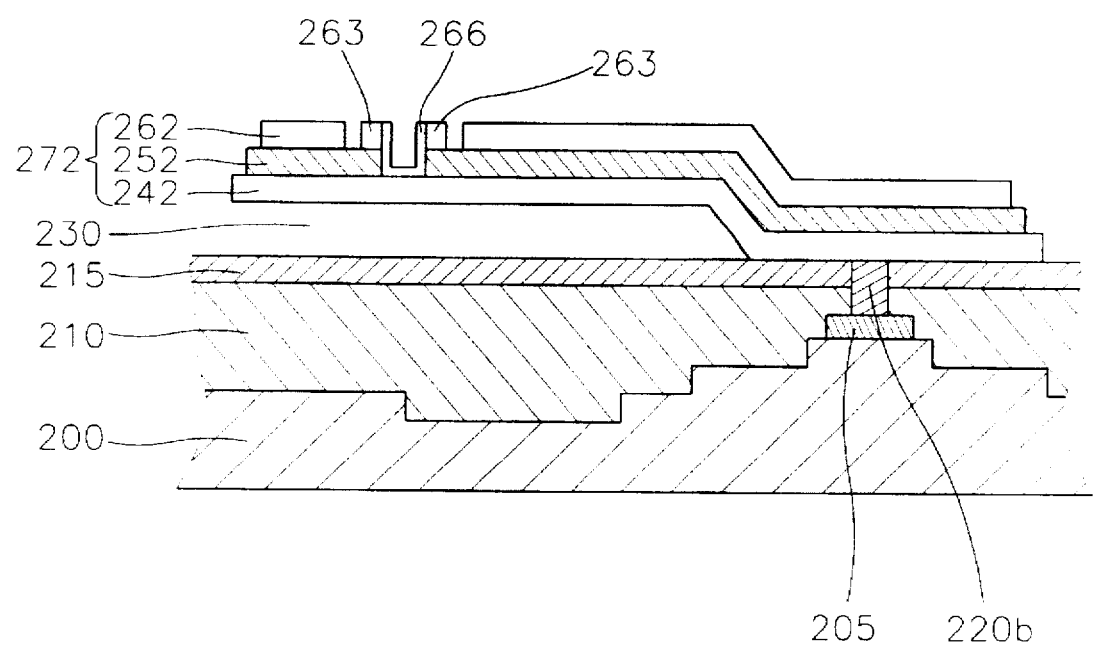
FIG. 13 is a cross-sectional view taken along line $D_1-D_2$ of FIG. 11.
Figure 14:
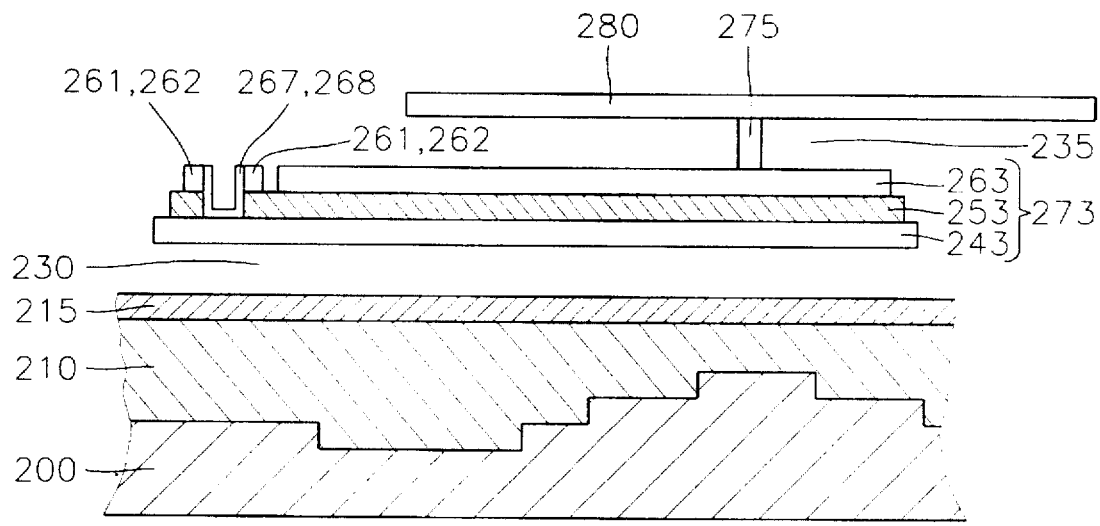
FIG. 14 is a cross-sectional view taken along line $E_1-E_2$ of FIG. 11.

FIG. 11 is a plan view for showing a thin film AMA in an optical projection system according to a second embodiment of the present invention. FIG. 12 is a cross-sectional view taken along line $C_1-C_2$ of FIG. 11. FIG. 13 is a cross-sectional view taken along line $D_1-D_2$ of FIG. 11, and FIG. 14 is a cross-sectional view taken along line $E_1-E_2$ of FIG. 11.

Referring to FIG. 11, the thin film AMA in an optical projection system according to the present embodiment has a substrate 200, an actuator 270 formed on the substrate 200, and a reflecting member 280 mounted on the actuator 270.

The actuator 270 has a first actuating portion 271 formed on a first portion of the substrate 200, a second actuating portion 272 formed on a second portion of the substrate 200, and a third actuating portion 273 integrally formed with the first actuating portion 271 and with the second actuating portion 272 between the first actuating portion 271 and the second actuating portion 272.

The reflecting member 280 is supported by a post 275 formed on a first potion of the third actuating portion 273. The actuator 270 is covered with the reflecting member 280. Preferably, the reflecting member 280 is a mirror.

Referring to FIG. 12, the substrate 200 in which an electrical wiring (not shown) is formed has a connecting terminal 205 formed on the electrical wiring, a passivation layer 210 overlaid on the substrate 200 and on the connecting terminal 205, an etch stop layer 215 overlaid on the passivation layer 210, and a plug 220a formed from the etch stop layer 215 to the connecting terminal 205 through the passivation layer 210. Preferably, the electrical wiring has a MOS transistor for switching operation.

The first actuating portion 271 has a first bottom electrode 241 having a bottom of a first portion attached to a portion of the etch stop layer 215 having the plug 220a and the connecting terminal 205 formed thereunder, and having a second portion formed parallel to and above the etch stop layer 215, a first active layer 251 formed on the first bottom electrode 241, and a first top electrode 261 formed on the first active layer 251. A first air gap 230 is interposed between the etch stop layer 215 and the second portion of the first bottom electrode 241.

The second actuating portion 272 has the same shape as that of the first actuating portion 271. Referring to FIG. 13, the second actuating portion 272 has a second bottom electrode 242 having a bottom of a first portion attached to a portion of the etch stop layer 215 adjacent to the portion under which the plug 220b and the connecting terminal 205 are formed, and having a second portion formed parallel to and above the etch stop layer 215, a second active layer 252 formed on the second bottom electrode 242, and a second top electrode 262 formed on the second active layer 252. The first air gap 230 is interposed between the etch stop layer 215 and the second portion of the second bottom electrode 242.

Referring to FIG. 14, the third actuating portion 273 has a third bottom electrode 243 which is formed parallel to and above the etch stop layer 215, a third active layer 253 formed on the third bottom electrode 243, and a third top electrode 263 formed on the third active layer 253. The third active layer 253 of the third actuating portion 273 is integrally formed with the first active layer 251 and with the second active layer 252. The first air gap 230 is also interposed between the etch stop layer 215 and the third bottom electrode 243.

Referring to FIG. 11, a first via contact 265 is formed on a first portion of the first actuating portion 271 in order to connect the first bottom electrode 241 to the third top electrode 263 extending to the first portion of the first actuating portion 271. A second via contact 266 is formed on a first portion of the second actuating portion 272 in order to connect the second bottom electrode 242 to the third top electrode 263 extending to the first portion of the second actuating portion 262. A third via contact 267 is formed on a first portion of the third actuating portion 273 in order to connect the third bottom electrode 243 to the first top electrode 261 extending to the first portion of the third actuating portion 273. A fourth via contact 268 is formed on a second portion of the third actuating portion 273 in order to connect the third bottom electrode 243 to the second top electrode 262 extending to the second portion of the third actuating portion 273. The third active layer 253 of the third actuating portion 273 is integrally formed with the first active layer 251 and with the second active layer 252.

The post 275 is formed on a portion of the third top electrode 263 of the third actuating portion 273. A central portion of the reflecting member 280 is supported by the post 275. A first portion of the reflecting member 280 is formed parallel to and above the third top electrode 263. A second air gap 235 is interposed between the third top electrode 263 and the first portion of the reflecting member 280. A second portion of the reflecting member 280 covers a portion of adjacent actuator. Preferably, the reflecting member 280 has a rectangular shape.

Each of the first bottom electrode 241, the second bottom electrode 242, and the third bottom electrode 243 has a rectangular shape. Also, the first bottom electrode 241, the second bottom electrode 242, and the third bottom electrode 243 are formed parallel to one another.

A first portion of the third active layer 253 is connected to a portion of the first active layer 251 and a second portion of the third active layer 253 is connected to a portion of the second active layer 252 so that the first active layer 251, the second active layer 252 and the third active layer 253 form an E-shape.

The first top electrode 261 has an upside-down L-shape and the second top electrode 262 has a reverse upside-down L-shape. The third top electrode 263 has a T-shape. The third top electrode 263 is formed between the first top electrode 261 and the second top electrode. Therefore, the actuator 270 having the first actuating portion 271, the second actuating portion 272, and the third actuating portion 273 has an E-shape.

A method for manufacturing the thin film AMA in an optical projection system according to the second embodiment of the present invention will be described below.

FIGS. 15 to 18C illustrate manufacturing steps of the thin film AMA according to the present embodiment.

Figure 15:
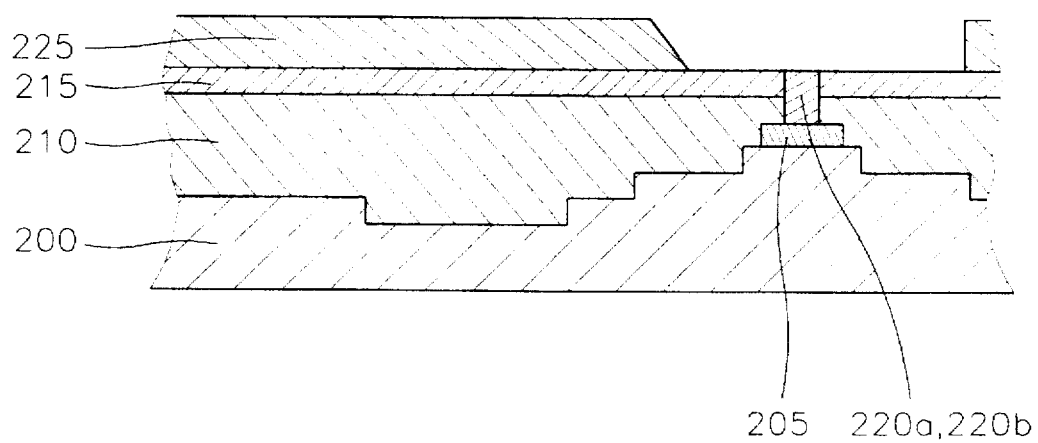
FIGS. 15 to 18C illustrate manufacturing steps of the thin film AMA in an optical projection system according to the second embodiment of the present invention.

Referring to FIG. 15, the connecting terminal 205 corresponding to the electrical wiring (not shown) is formed on the substrate 200 in which the electrical wiring is formed. The connecting terminal 205 is formed by using a metal, for example tungsten. The connecting terminal 205 is electrically connected to the electrical wiring. The electrical wiring and the connecting terminal 205 receive a first signal from outside and transmit the first signal to the first bottom electrode 241 and to the second bottom electrode 242. The first signal is a picture current signal.

The passivation layer 210 is overlaid on the connecting terminal 205 and on the substrate 200 by using PSG. The passivation layer 210 is formed by a CVD method so that the passivation layer 210 has a thickness of between about 0.1 µm and 1.0 µm. The passivation layer 210 protects the substrate 200 having the electrical wiring and the connecting terminal 205 during successive manufacturing steps.

The etch stop layer 215 is overlaid on the passivation layer 210 by using a nitride so that the etch stop layer 215 has a thickness of between about 1000 Å and 2000 Å. The etch stop layer 215 is formed by a LPCVD method. The etch stop layer 215 protects the passivation layer 210 and the substrate 200 during subsequent etching steps.

After portions of the etch stop layer 215 and the passivation layer 210 are etched from a portion the etch stop layer 215 having the connecting terminal 205 which is formed thereunder, plugs 220a, 220b are formed in portions of the etch stop layer 215 and the passivation layer 210 by using an electrically conductive metal such as tungsten or titanium. The plugs 220a, 220b are formed by a sputtering method or a CVD method. The plugs 220a, 220b are electrically connected to the connecting terminal 205. Thus, the first signal is applied to the first bottom electrode 241 and to the second bottom electrode 242 which are successively formed through the electrical wiring, the connecting terminal 205, and the plugs 220a, 220b.

A sacrificial layer 225 is overlaid on the etch stop layer 215 and on the plugs 220a, 220b by using PSG, metal, or oxide. The sacrificial layer 225 is formed by an APCVD method, a sputtering method, or an evaporation method so that the sacrificial layer 225 has a thickness of between about 0.5 µm and 2.0 µm. In this case, the degree of flatness of the sacrificial layer 225 is poor because the sacrificial layer 225 covers the top of the substrate 200 having the electrical wiring and the connecting terminal 205. Therefore, the surface of the sacrificial layer 225 is planarized by using an SOG or by a CMP method. Subsequently, a first portion of the sacrificial layer 225 under which the connecting terminal 205 is formed is patterned in order to expose a first portion of the etch stop layer 215 where the plugs 220a, 220b are formed.

Figure 16A:
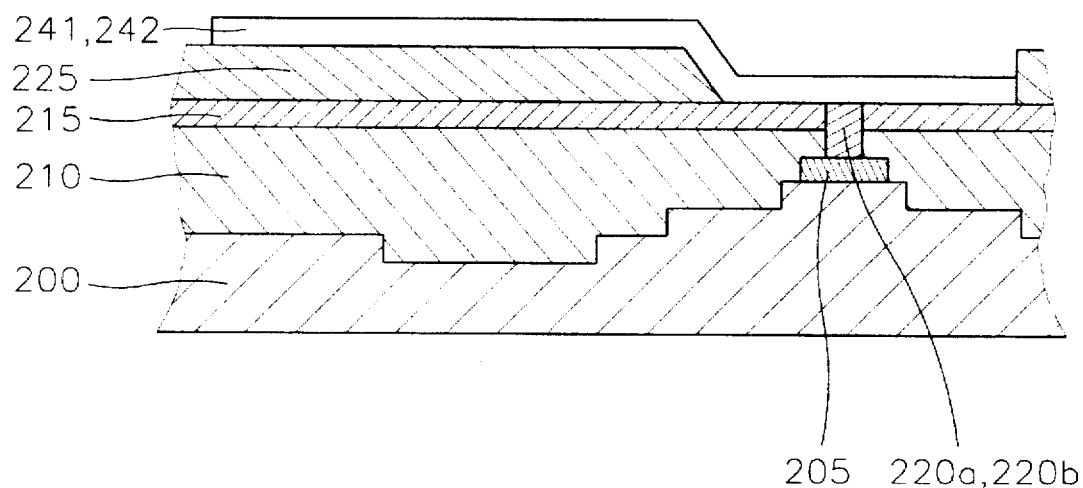
Figure 16B:
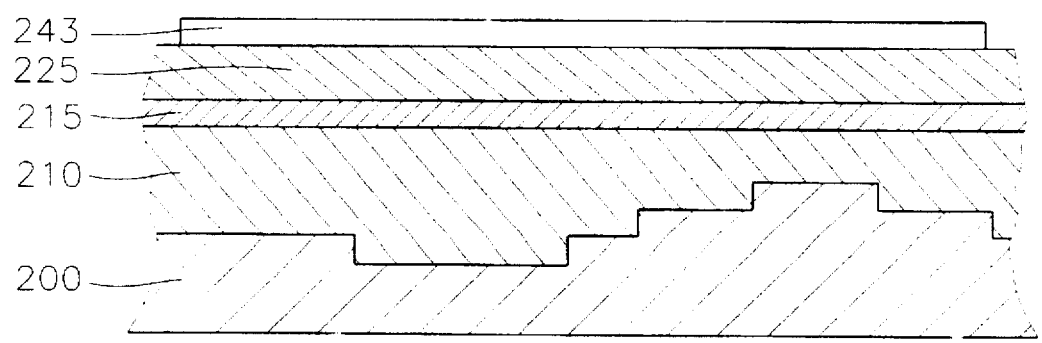

FIG. 16A illustrates manufacturing steps of the first bottom electrode 241 and the second bottom electrode 242 and FIG. 16B illustrates manufacturing steps of the third bottom electrode 243.

Figure 16C:
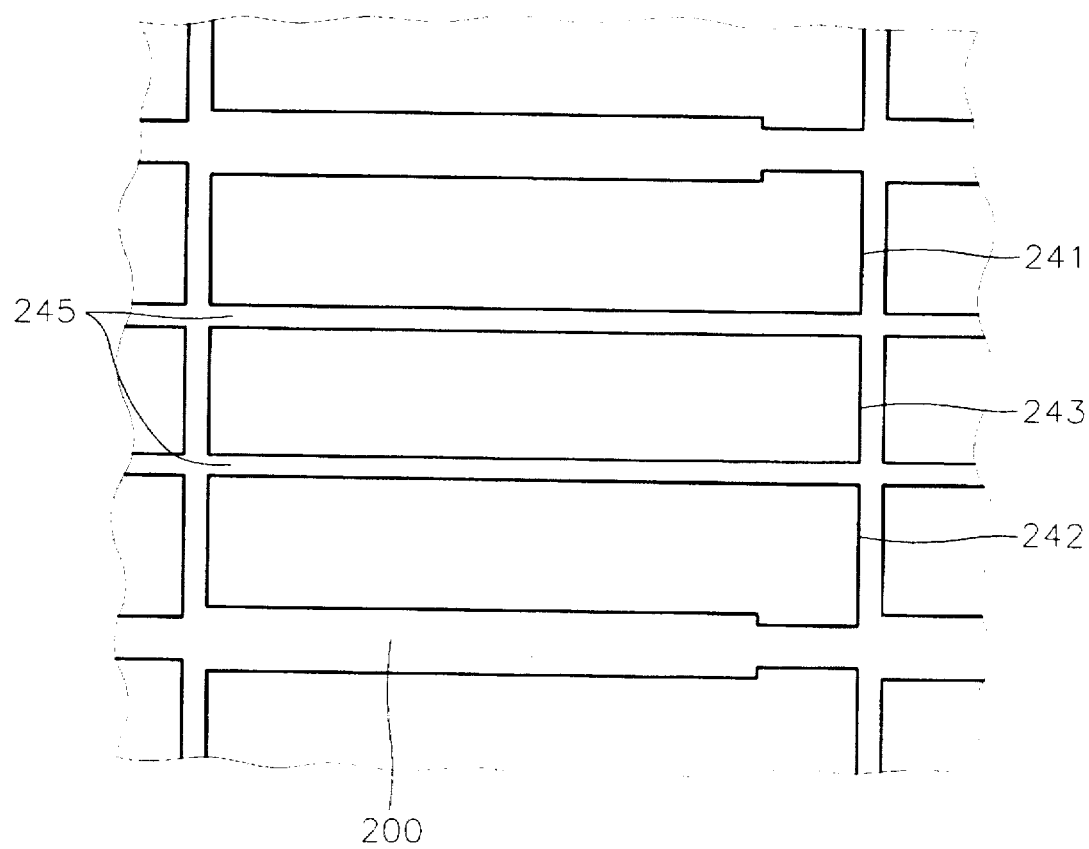

Referring to FIGS. 16A to 16C, a bottom electrode layer 240 is overlaid on the exposed portion of the etch stop layer 215 and on the sacrificial layer 225. The bottom electrode layer 240 is formed by using an electrically conductive metal such as platinum, tantalum, or platinum-tantalum alloy. The bottom electrode layer 240 is formed by a sputtering method or a CVD method so that the bottom electrode layer 240 has a thickness of between about 0.1 µm and 1.0 µm. Subsequently, the bottom electrode layer 240 is patterned so as to form the first bottom electrode 241, the second bottom electrode 242, and the third bottom electrode 243. At the same time, iso-cutting 245 is performed between the first bottom electrode 241 and the third bottom electrode 243 and between the second bottom electrode 242 and the third bottom electrode 243. The iso-cutting 245 is performed so as to shorten the first bottom electrode 241, the second bottom electrode 242, and the third bottom electrode 243 in such a manner that each of the first bottom electrode 241, the second bottom electrode 242, and the third bottom electrode 243 has a rectangular shape, as shown in FIG. 16C. Also, the first bottom electrode 241, the second bottom electrode 242, and the third bottom electrode 243 are formed parallel to one another.

Figure 17A:
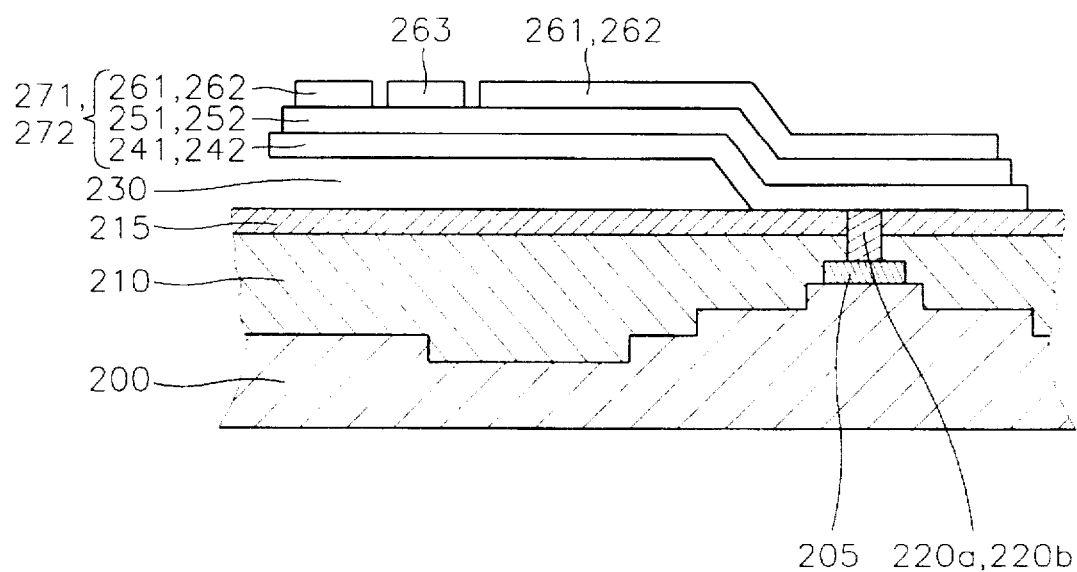
Figure 17B:
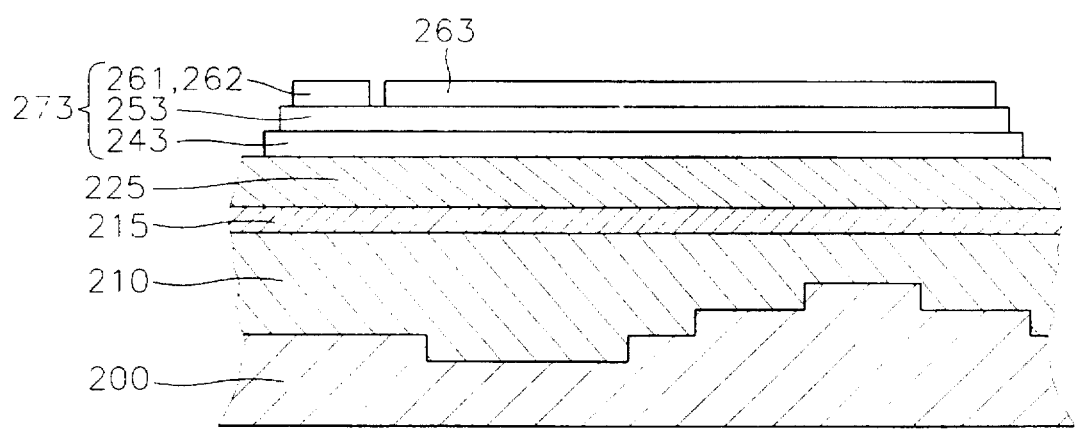
Figure 17C:
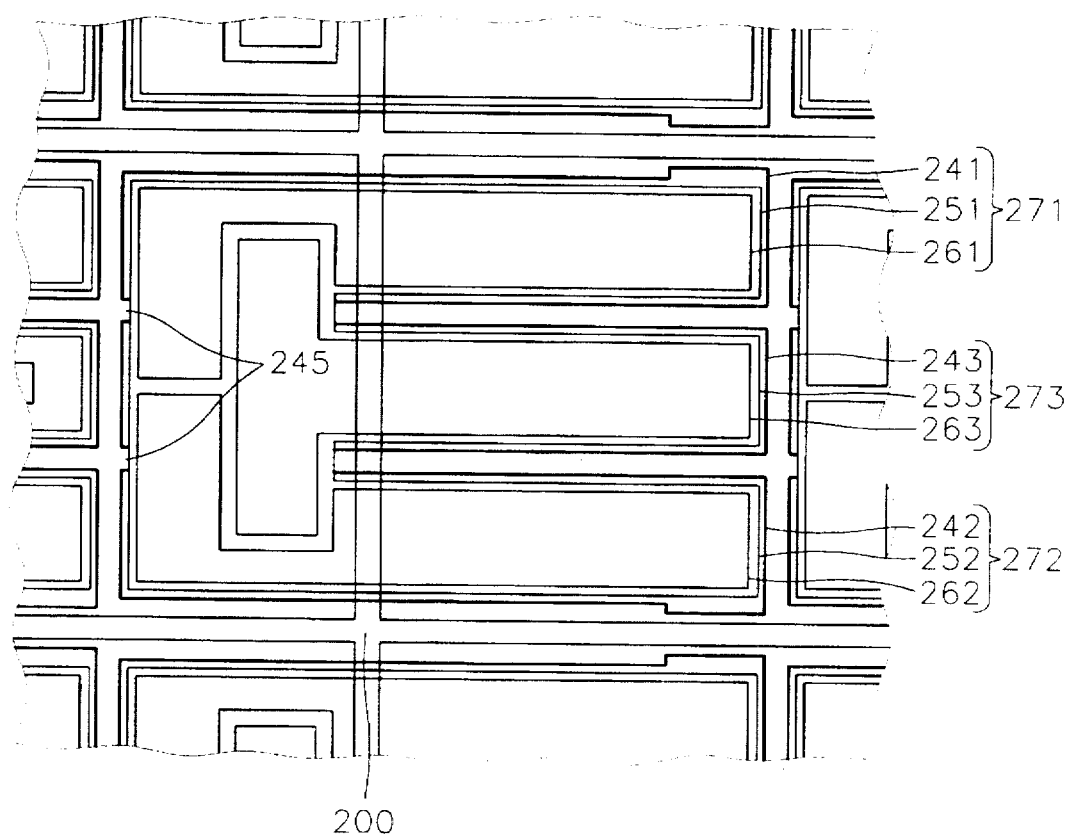

Referring to FIGS. 17A to 17C, an active layer 250 is overlaid on the first bottom electrode 241, the second bottom electrode 242, and the third bottom electrode 243. The active layer 250 is formed by using a piezoelectric material such as ZnO, PZT, or PLZT so that the active layer 250 has a thickness of between about 0.1 µm and 1.0 µm. Also, the active layer 250 is formed by using an electrostrictive material such as PMN. After the active layer 250 is formed by a sol-gel method, a sputtering method, or a CVD method, the active layer 250 is annealed by a RTA method. Then, the active layer 250 is polled. When the active layer 250 is manufactured by using ZnO, the active layer 250 is formed at a low temperature of between 300° C. and 600° C. In addition, the polling step is needless when the active layer 250 is manufactured by using ZnO because the active layer 250 comprised of ZnO is polled by an electric field generated according to the first signal and a second signal. Hence, a thermal attack to the substrate 200 may be decreased. Subsequently, the active layer is patterned so as to form a first active layer 251, a second active layer 252 and the third active layer 253, as shown in FIG. 17C. At that time, the first active layer 251, the second active layer 252 and the third active layer 253 are connected to form an E-shape.

A top electrode layer 260 is overlaid on the first active layer 251, the second active layer 252 and the third active layer 253. The top electrode layer 260 is formed by using a metal having an electrical conductivity, for example aluminum, platinum, or silver. The top electrode layer 260 is formed by a sputtering method or a CVD method so that the top electrode layer 260 has a thickness of between about 0.1 µm and 1.0 µm. Subsequently, the top electrode layer 260 is patterned so as to form the first top electrode 261, the second top electrode 262, and the third top electrode 263, as shown in FIG. 17C. The first top electrode 261 has an upside-down L-shape and the second top electrode 262 has a reverse upside-down L-shape. The third top electrode 263 has a T-shape. The third top electrode 263 is formed between the first top electrode 261 and the second top electrode 262. Therefore, the actuator 270 having the first actuating portion 271, the second actuating portion 272, and the third actuating portion 273 has an E-shape. The second signal is applied to the first top electrode 261 and the second top electrode 262 from a common line (not shown). The second signal is a bias current signal.

Figure 18A:
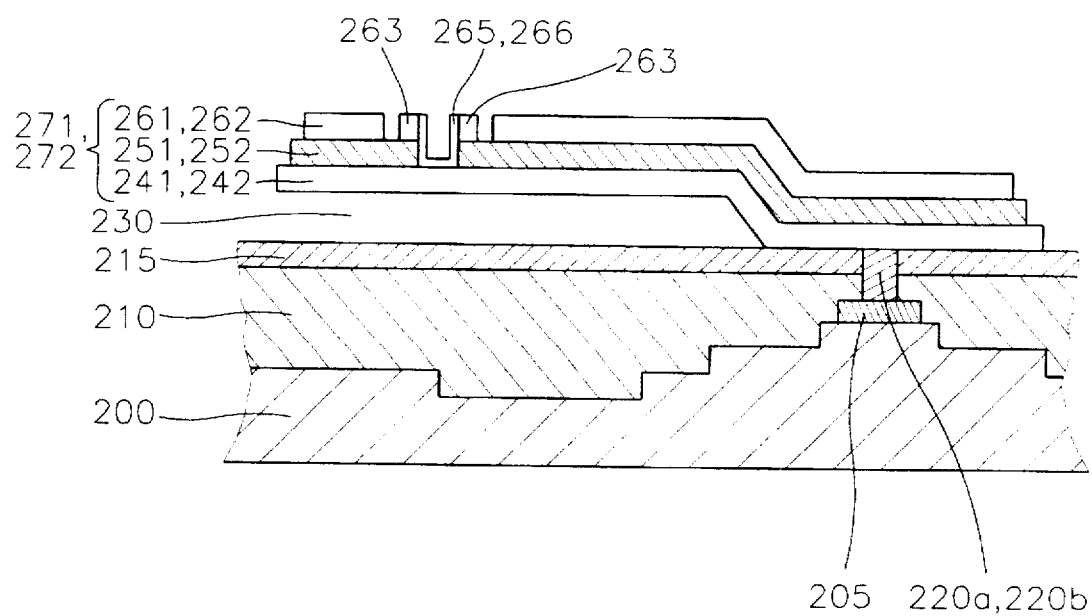
Figure 18B:
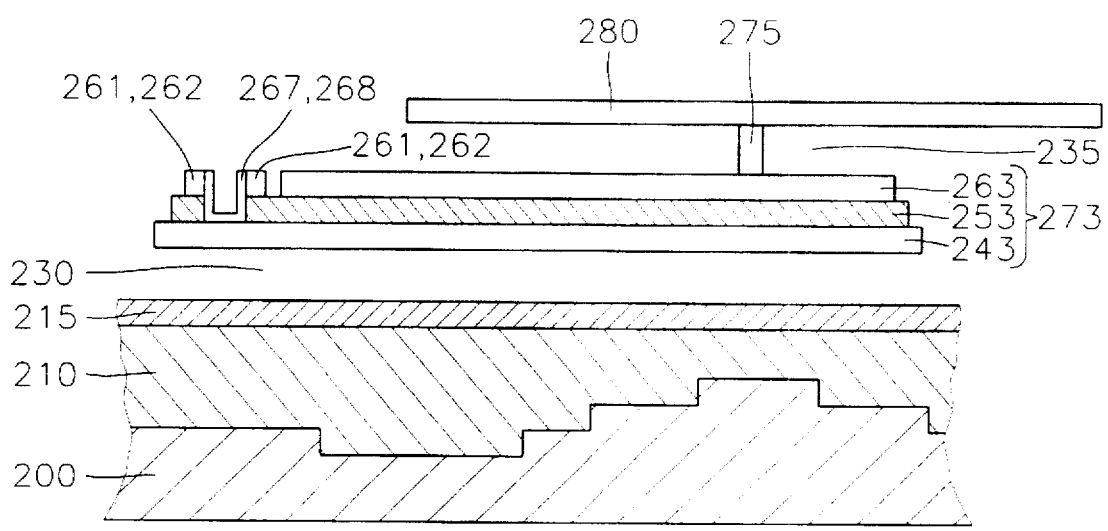
Figure 18C:
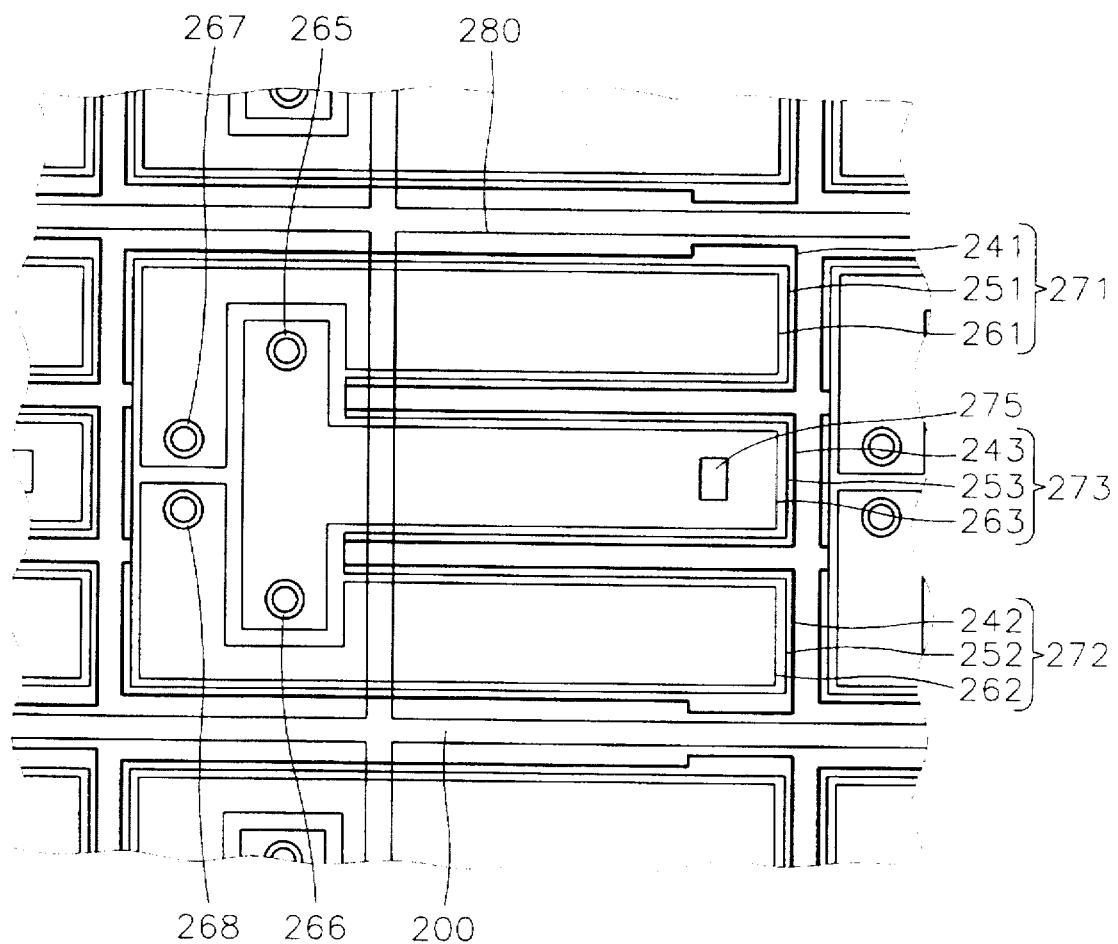

Referring to FIGS. 18A to 18C, a first via hole is formed by etching the third top electrode 263 extending to the first portion of the first actuating portion 271 and by etching the first active layer 251. A first via contact 265 is formed in the first via hole by using a metal, such as tungsten or titanium. The first via contact 265 is formed by a sputtering method and patterned.

A second via hole, a third via hole, and a fourth via hole are formed by the same method as that of the first via hole. Also, a second via contact 266, a third via contact 267 and a fourth via contact 268 are formed by the same method as that of the first via contact 265. The second via hole is formed by etching the third top electrode 263 extending to the first portion of the second actuating portion 272 and by etching the second active layer 252. The second via contact 266 is formed in the second via hole by using a metal, such as tungsten or titanium. The second via contact 266 is also formed by a sputtering method and patterned. The third via hole is formed by etching the first top electrode 261 extending to the first portion of the third actuating portion 273 and by etching the third active layer 253. The fourth via hole is formed by etching the second top electrode 262 extending to the first portion of the third actuating portion 273 and by etching the third active layer 253. The third via contact 267 is formed in the third via hole by using a metal, such as tungsten or titanium. The fourth via contact 268 is formed in the fourth via hole by using a metal, such as tungsten or titanium. The third via contact 267 and the fourth via contact 268 are also formed by a sputtering method and patterned.

The first bottom electrode 241 is connected to the third top electrode 263 extending to the first actuating portion 271 through the first via contact 265. The second bottom electrode 242 is connected to the third top electrode 263 extending to the second actuating portion 272 through the second via contact 266. Also, a portion of the first top electrode 261 extending to the third actuating portion 273 is connected to the third bottom electrode 243 through the third via contact 267. Also, a portion of the second top electrode 262 extending to the third actuating portion 273 is connected to the third bottom electrode 243 through the fourth via contact 268. The first signal is applied to the first bottom electrode 241 and the second bottom electrode 242 via the electrical wiring, the connecting terminal 205, and the plugs 220a, 220b. Therefore, when the first signal is applied to the first bottom electrode 241 and the second bottom electrode 242, at the same time, the second signal is applied to the first top electrode 261 and the second top electrode 262, electric fields are generated between the first top electrode 261 and the first bottom electrode 241 and between the second top electrode 262 and the second bottom electrode 242. The first active layer 251 and the second active layer 252 are each deformed by such electric fields. At the same time, the first signal which is applied to the first bottom electrode 242 is transmitted to the third top electrode 263 via the first via contact 265. Also, the second signal which is applied to the first top electrode 261 is transmitted to the third bottom electrode 243 via the third via contact 267. Therefore, between the third top electrode 263 and the third bottom electrode 243, a reverse electric field is generated opposite to the electric fields which are generated between the first top electrode 261 and the first bottom electrode 241 and between the second top electrode 262 and the second bottom electrode 242. Therefore, the third active layer 253 is deformed by the reverse electric field in a direction opposite to that of the first active layer 251 and the second active layer 252.

Subsequently, the sacrificial layer 225 is removed by using a vapor of hydrogen fluoride. When the sacrificial layer 225 is removed, the first air gap 230 is formed at the position where the sacrificial layer 225 is positioned. Hence, the first actuating portion 271, the second actuating portion 272, and the third actuating portion 273 are complete.

Referring to FIG. 18C, after a photo resist (not shown) is coated on the first actuating portion 271, on the second actuating portion 272 and on the third actuating portion 273, the photo resist is patterned in order to expose a portion of the third top electrode 263. The post 275 is formed on the exposed portion of the third top electrode 263 and the reflecting member 280 is formed on the post 275 and on the photo resist. The post 275 and the reflecting member 280 are formed by using a reflective metal such as aluminum, platinum, or silver. The post 275 and the reflecting member 280 are formed by a sputtering method or an evaporation method. The reflecting member 280 has a thickness of between about 500 Å and 1000 Å. Preferably, the reflecting member 280 is a mirror. The photo resist is removed by stripping. When the photo resist is removed, the second air gap 235 is formed at the position where the photo resist is positioned. The reflecting member 280 has a plate shape. A central portion of the reflecting member 280 is supported by the post 275. The first portion of the reflecting member 280 is formed parallel to and above the third top electrode 263. The second air gap 235 is interposed between the third top electrode 263 and the first portion of the reflecting member 280. The second portion of the reflecting member 280 is formed to cover the adjacent actuator. Hence, the actuator 270, on which the reflecting member 280 is formed, is complete.

The operation of the thin film AMA in an optical projection system according to the present embodiment will be described.

In the thin film AMA according to the present embodiment, the first signal, that is the picture current signal, is applied to the first bottom electrode 241 and to the second bottom electrode 242 via the electrical wiring, the connecting terminal 105, and the plugs 220a, 220b. The first signal is also applied to the third top electrode 263 via the first via contact 265 and the second via contact 266. At the same time, the second signal, that is the bias current signal, is applied to the first top electrode 261 and the second top electrode 262 from the common line. Also, the second signal is also applied to the third bottom electrode 243 via the third via contact 267 and the fourth via contact 268. Thus, electric fields are each generated between the first top electrode 261 and the first bottom electrode 241, between the second top electrode 262 and the second bottom electrode 242, and between the third top electrode 263 and the third bottom electrode 243. The first active layer 251, which is formed between the first top electrode 261 and the first bottom electrode 241, and the second active layer 252, which is formed between the second top electrode 262 and the second bottom electrode 242, are deformed by the electric fields. The first active layer 251 and the second active layer 252 are each deformed in a direction perpendicular to the electric fields. In this case, each the first active layer 251 and the second active layer 252 is actuated in the direction opponent to the positions where the first bottom electrode 241 and the second bottom electrode 242 are positioned. The third active layer 253, which is formed between the third top electrode 263 and the third bottom electrode 243, is deformed by the reverse electric field. The third active layer 253 is also deformed in a direction perpendicular to the reverse electric field. So, the third active layer 253 is actuated in the direction opponent to the position where the third top electrode 263 is positioned. That is, the first active layer 251 and the second active layer 252 is actuated upward and the third active layer 253 is actuated downward. The tilting angle of the first active layer 251 is equal to that of the second active layer 252. Also, the tilting angle of the third active layer 253 is equal to that of the first active layer 251.

If the tilting angle of the first active layer 251 is θ, the first actuating portion 271 having the first active layer 251 is actuated upward by a tilting angle of θ. At the same time, the second actuating portion 272 having the second active layer 252 is actuated upward by a tilting angle of θ. Also, the third actuating portion 273 having the third active layer 253 is actuated downward by a tilting angle of θ. When the first actuating portion 271 and the second actuating portion 272 are actuated upward, the third actuating portion 273 connected to the first actuating portion 271 and to the second actuating portion 272 is actuated upward together with the first actuating portion 271 and the second actuating portion 272. At this state, the third actuating portion 273 having the third active layer 253 is actuated downward by a tilting angle of θ because the third active layer 253 is actuated downward. Therefore, the final tilting angle of the third actuating portion 273 is equal to 2θ. The reflecting member 280 for reflecting an incident light from the light source tilts with the angle of 2θ because the reflecting member 280 is formed on the third actuating portion 273.

Therefore, the thin film AMA in an optical projection system according to the present invention has a reflecting member and actuator including a plurality of actuating portions in which adjacent actuating portions are actuated in opponent directions one after another, so the tilting angle of reflecting members installed on actuators is two times bigger than that of the conventional thin film AMA even though the thin film AMA according to the present invention has a small volume. Hence, the light efficiency of the light reflected by the reflecting member increases and the contrast of the picture projected onto a screen also increases. Furthermore, the distance between the light source and the screen is wider because the tilting angle of the reflecting member is bigger.

Although preferred embodiments of the present invention have been described, it is understood that the present invention should not be limited to these preferred embodiments, but various changes and modifications can be made by one skilled in the art within the spirit and scope of the invention as hereinafter claimed.

What is claimed is:

1. A thin film actuated mirror array in an optical projection system actuated by a first signal and a second signal, said thin film actuated mirror array comprising:

a substrate having an electrical wiring and a connecting terminal, for receiving the first signal from outside and transmitting the first signal;

an actuator comprising a first actuating portion having i) a first bottom electrode for receiving the first signal, said first bottom electrode being formed on a first portion of said substrate, ii) a first top electrode corresponding to said first bottom electrode, for receiving the second signal and generating an electric field between said first top electrode and said first bottom electrode, and iii) a first active layer formed between said first top electrode and said first bottom electrode and deformed by the electric field; a second actuating portion having a) a second bottom electrode for receiving the second signal, said second bottom electrode being formed above a second portion of said substrate, b) a second top electrode corresponding to said second bottom electrode, for receiving the first signal, said second top electrode generating an electric field between said second top electrode and said second bottom electrode, and c) a second active layer formed between said second top electrode and said second bottom electrode and deformed by the electric field, said second active layer being integrally formed with said first active layer, said second actuating portion being actuated in a direction opposite to that of said first actuating portion; a first connecting means for connecting said first bottom electrode to said second top electrode; and a second connecting means for connecting said first top electrode to said second bottom electrode; and a reflecting means for reflecting a light, said reflecting means being formed on said second actuating portion.

2. The thin film actuated mirror array in an optical projection system as claimed in claim 1, wherein said first bottom electrode and said second bottom electrode are comprised of an electrically conductive metal, said first active layer and said second active layer are comprised of a piezoelectric material or an electrostrictive material, and said first top electrode and said second top electrode are comprised of an electrically conductive metal.

3. The thin film actuated mirror array in an optical projection system as claimed in claim 2, wherein said first bottom electrode and said second bottom electrode are comprised of platinum, tantalum, or platinum-tantalum alloy, said first active layer and said second active layer are comprised of Pb(Zr, Ti)O$_3$, (Pb, La)(Zr, Ti)O$_3$, or Pb(Mn, Nb)O$_3$, and said first top electrode and said second top electrode are comprised of aluminum, platinum, or silver.

4. The thin film actuated mirror array in an optical projection system as claimed in claim 1, wherein said first active layer and said second active layer are comprised of ZnO.

5. The thin film actuated mirror array in an optical projection system as claimed in claim 1, wherein said second actuating portion further comprises a post for supporting said reflecting means, said post being formed on a portion of said second top electrode, and said reflecting means is comprised of a reflective metal.

6. The thin film actuated mirror array in an optical projection system as claimed in claim 5, wherein said reflecting means is comprised of aluminum, platinum, or silver.

7. The thin film actuated mirror array in an optical projection system as claimed in claim 1, wherein said first bottom electrode has an L-shape and said second bottom electrode has a reverse L-shape so that said first bottom electrode and said second bottom electrode together form a U-shape.

8. The thin film actuated mirror array in an optical projection system as claimed in claim 1, wherein said first active layer and said second active layer are connected to form a U-shape.

9. The thin film actuated mirror array in an optical projection system as claimed in claim 1, wherein said first top electrode has an L-shape and said second top electrode has a reverse L-shape which is smaller than said first top electrode.

10. The thin film actuated mirror array in an optical projection system as claimed in claim 9, wherein said first connecting means is a first via contact formed from said second top electrode to said first bottom electrode through said first active layer and said second connecting means is a second via contact formed from said first top electrode to said second bottom electrode through said second active layer.

11. The thin film actuated mirror array in an optical projection system as claimed in claim 10, wherein said first via contact and said second via contact are comprised of an electrically conductive metal.

12. The thin film actuated mirror array in an optical projection system as claimed in claim 11, wherein said first via contact and said second via contact are comprised of tungsten or titanium.

13. The thin film actuated mirror array in an optical projection system as claimed in claim 1, wherein said actuator has a U-shape.

14. A thin film actuated mirror array in an optical projection system actuated by a first signal and a second signal, said thin film actuated mirror array comprising:

a substrate having an electrical wiring and a connecting terminal, for receiving the first signal from outside and transmitting the first signal;

an actuator comprising a first actuating portion formed on a first portion of said substrate, said first actuating portion having a first bottom electrode for receiving the first signal, a first top electrode corresponding to said first bottom electrode, for receiving the second signal and generating an electric field between said first top electrode and said first bottom electrode, and a first active layer formed between said first top electrode and said first bottom electrode and deformed by the electric field; a second actuating portion formed on a second portion of said substrate, said second actuating portion having a second bottom electrode for receiving the first signal, a second top electrode corresponding to said second bottom electrode, for receiving the second signal and generating an electric field between said second top electrode and said second bottom electrode, and a second active layer formed between said second top electrode and said second bottom electrode and deformed by the electric field, said second active layer being integrally formed with said first active layer, said second actuating portion being actuated in the same direction as that of said first actuating portion; a third actuating portion formed between said first actuating portion and said second actuating portion, said third actuating portion having a third bottom electrode for receiving the second signal, a third top electrode corresponding to said third bottom electrode, for receiving the first signal and generating an electric field between said third top electrode and said third bottom electrode, and a third active layer formed between said third top electrode and said third bottom electrode and deformed by the electric field, said third active layer being integrally formed with said first active layer and with said second active layer, said third actuating portion being actuated in a direction opponent to said first actuating portion; a first connecting means for connecting said first bottom electrode to said third top electrode; a second connecting means for connecting said third top electrode to said second bottom electrode; a third connecting means for connecting said first top electrode to said third bottom electrode; and a fourth connecting means for connecting said second top electrode and said third bottom electrode; and a reflecting means for reflecting a light, said reflecting means being formed on said third actuating portion.

15. Thin film actuated mirror array in an optical projection system as claimed in claim 14, wherein said first bottom electrode, said second bottom electrode and said third bottom electrode are comprised of an electrically conductive metal, said first active layer, said second active layer, and said third active layer are comprised of a piezoelectric material or an electrostrictive material, and said first top electrode, said second top electrode, and said third top electrode are comprised of an electrically conductive metal.

16. The thin film actuated mirror array in an optical projection system as claimed in claim 15, wherein said first bottom electrode, said second bottom electrode, and said third bottom electrode are comprised of platinum, tantalum, or platinum-tantalum alloy, said first active layer, said second active layer, and said third active layer are comprised of ZnO, Pb(Zr, Ti)O$_3$, (Pb, La)(Zr, Ti)O$_3$, or Pb(Mn, Nb)O$_3$, and said first top electrode, said second top electrode, and said third top electrode are comprised of aluminum, platinum, or silver.

17. The thin film actuated mirror array in an optical projection system as claimed in claim 14, wherein said first bottom electrode, said second bottom electrode, and said third bottom electrode each has a rectangular shape and are parallelly arranged one after another.

18. The thin film actuated mirror array in an optical projection system as claimed in claim 14, wherein said first active layer, said second active layer, and said third active layer are connected to form an E-shape.

19. The thin film actuated mirror array in an optical projection system as claimed in claim 14, wherein said first top electrode has an upside-down L-shape, said second top electrode has a reverse upside-down L-shape, and said third top electrode has a T-shape.

20. The thin film actuated mirror array in an optical projection system as claimed in claim 14, wherein said first connecting means is a first via contact, said second connecting means is a second via contact, said third connecting means is a third via contact, and said fourth connecting means is a fourth via contact.

21. The thin film actuated mirror array in an optical projection system as claimed in claim 20, wherein said first via contact, said second via contact, said third via contact, and said fourth via contact are comprised of an electrically conductive metal.

22. The thin film actuated mirror array in an optical projection system as claimed in claim 21, wherein said first via contact, said second via contact, said third via contact, and said fourth via contact are comprised of tungsten or titanium.

23. The thin film actuated mirror array in an optical projection system as claimed in claim 14, wherein said actuator has an E-shape.

24. A method for manufacturing a thin film actuated mirror array in an optical projection system actuated by a first signal and a second signal, said method for manufacturing the thin film actuated mirror array in an optical projection system comprising the steps of:

providing a substrate having an electrical wiring and a connecting terminal, for receiving the first signal from outside and transmitting the first signal;

forming a bottom electrode layer on said substrate and patterning said bottom electrode layer to form a first bottom electrode for receiving the first signal and to form a second bottom electrode for receiving the second signal;

forming an active layer on said first bottom electrode and on said second bottom electrode and patterning said active layer to form a first active layer and to form a second active layer, said first active layer being deformed by a first electric field, said second active layer being deformed by a second electric field generated in a direction opponent to the first electric field;

forming a top electrode layer on said first active layer and on said second active layer and patterning said top electrode layer to form a first top electrode for receiving the second signal and generating the first electric field and to form a second top electrode for receiving the first signal and generating the second electric field;

forming a first connecting means for connecting said first bottom electrode to said second top electrode;

forming a second connecting means for connecting said first top electrode to said second bottom electrode; and forming a reflecting means for reflecting a light on said second top electrode.

25. The method for manufacturing a thin film actuated mirror array in an optical projection system as claimed in claim 24, wherein the step of forming said bottom electrode layer is performed after forming a sacrificial layer on said substrate and patterning said sacrificial layer in order to expose a portion of said substrate adjacent to said connecting terminal.

26. The method for manufacturing a thin film actuated mirror array in an optical projection system as claimed in claim 25, wherein the step of forming said sacrificial layer is performed by an atmospheric pressure chemical vapor deposition method, a sputtering method, or an evaporation method by using phosphor-silicate glass, a metal, or an oxide.

27. The method for manufacturing a thin film type actuated mirror array in an optical projection system as claimed in claim 25, wherein the step of forming said sacrificial layer further comprises planarizing said sacrificial layer by using a spin on glass or by a chemical mechanical polishing method.

28. The method for manufacturing a thin film actuated mirror array in an optical projection system as claimed in claim 24, wherein the step of forming said bottom electrode layer is performed by a sputtering method or a chemical vapor deposition method by using platinum, tantalum, or platinum-tantalum alloy, the step of forming said top electrode layer is performed by a sputtering method or a chemical vapor deposition method by using aluminum, platinum, or silver, and the step of forming said reflecting means is performed by a sputtering method or an evaporation method by using aluminum, platinum, or silver.

29. The method for manufacturing a thin film actuated mirror array in an optical projection system as claimed in claim 24, wherein the step of forming said active layer is performed by a sol-gel method, a sputtering method, or a chemical vapor deposition method by using ZnO, Pb(Zr, Ti)$O_3$, (Pb, La)(Zr, Ti)$O_3$, or Pb(Mn, Nb)$O_3$.

30. The method for manufacturing a thin film actuated mirror array in an optical projection system as claimed in claim 24, wherein the step of forming said first connecting means is performed after forming a first via hole by etching said second top electrode and said first active layer, and the step of forming said second connecting means is performed after forming a second via hole by etching said first top electrode and said second active layer.

* * * * *